US012767272B2

(12) United States Patent
Schwenk et al.

(10) Patent No.: US 12,767,272 B2
(45) Date of Patent: Oct. 20, 2026

(54) DRIVE ASSEMBLY

(71) Applicant: Robert Bosch GmbH, Stuttgart (DE)

(72) Inventors: Daniel Schwenk, Dornstetten (DE); Adolf Dillmann, Muensingen (DE); Alexander Elter, Oftersheim (DE); Christoph Zimmermann, Reutlingen (DE); Christoph Schumacher, Dusslingen (DE); Daniel Hettinger, Reutlingen-Bronnweiler (DE); Harald Hundt, Aichelberg (DE); Julian Binder, Wannweil (DE); Peter Kimmich, Wannweil (DE); Quoc-Dat Nguyen, Steinenbronn (DE); Sigmund Braun, Neckartenzlingen (DE); Stefan Holst, Reutlingen (DE); Tobias Landenberger, Schorndorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 761 days.

(21) Appl. No.: 18/170,894

(22) Filed: Feb. 17, 2023

(65) Prior Publication Data

US 2023/0278663 A1 Sep. 7, 2023

(30) Foreign Application Priority Data

Mar. 1, 2022 (DE) ..................... 10 2022 202 102.9
Jun. 27, 2022 (DE) ..................... 10 2022 206 431.3

(51) Int. Cl.
*B62M 6/55* (2010.01)

(52) U.S. Cl.
CPC .................................... *B62M 6/55* (2013.01)

(58) Field of Classification Search
CPC . B62M 6/55; B62M 6/40; B62M 6/80; B62M 7/04; F03G 5/064; B62K 19/34
See application file for complete search history.

(56) References Cited

U.S. PATENT DOCUMENTS

| | | | | |
|---|---|---|---|---|
| 2,743,783 | A | 5/1956 | Kreidler | |
| 4,077,485 | A | 3/1978 | Bonora et al. | |
| 4,085,814 | A | 4/1978 | Davidson et al. | |
| 10,300,985 | B2 * | 5/2019 | Mano | F16B 5/0233 |
| 2017/0314593 | A1 | 11/2017 | Mano | |
| 2019/0039677 | A1 * | 2/2019 | Noda | B62M 6/90 |
| 2023/0322327 | A1 * | 10/2023 | Greven | B62M 6/55 180/206.4 |

(Continued)

FOREIGN PATENT DOCUMENTS

| | | | | |
|---|---|---|---|---|
| CN | 116710353 A * | 9/2023 | | B62M 6/55 |
| DE | 9407684 U1 | 7/1994 | | |

(Continued)

*Primary Examiner* — Drew J Brown

(74) *Attorney, Agent, or Firm* — NORTON ROSE FULBRIGHT US LLP

(57) ABSTRACT

A drive assembly of a vehicle operable with muscular power and/or motor power. The drive assembly includes: a drive unit; a frame interface, the drive unit being arranged at least partially between a first wall and a second wall of the frame interface, the drive unit including a through-hole; two sleeves inserted into the through-hole of the drive unit on both sides; and a through-bolt inserted through the through-hole and the two sleeves and holding the drive unit on each of the two walls.

38 Claims, 17 Drawing Sheets

(56) References Cited

U.S. PATENT DOCUMENTS

2023/0415849 A1 * 12/2023 Hemsing ................ B62K 19/34

FOREIGN PATENT DOCUMENTS

| | | | | | |
|---|---|---|---|---|---|
| DE | 102017201617 | A1 * | 8/2018 | .............. | B62M 6/55 |
| DE | 202020106855 | U1 | 4/2021 | | |
| DE | 102020200385 | A1 | 7/2021 | | |
| DE | 102021201023 | A1 * | 8/2022 | ........... | B60K 7/0007 |
| DE | 102021201404 | A1 * | 8/2022 | ............ | F16B 5/0233 |
| DE | 102021202473 | A1 * | 9/2022 | .............. | F16B 19/02 |
| EP | 3795462 | A1 | 3/2021 | | |
| JP | H08169377 | A | 7/1996 | | |
| JP | 2001071982 | A | 3/2001 | | |
| JP | 2019031263 | A | 2/2019 | | |
| JP | 2023553030 | A * | 12/2023 | ........... | B62K 25/286 |
| WO | WO-2022043182 | A1 * | 3/2022 | ............. | B62K 19/30 |

* cited by examiner

DRIVE ASSEMBLY

CROSS REFERENCE

The present application claims the benefit under 35 U.S.C. § 119 of German Patent Application Nos. DE 10 2022 202 102.9 filed on Mar. 1, 2022, and DE 10 2022 206 431.3 filed on Jun. 27, 2022, which are expressly incorporated herein by reference in their entireties.

FIELD

The present invention relates to a drive assembly and to a vehicle comprising the drive assembly.

BACKGROUND INFORMATION

Drive assemblies with drive units held between two walls of a frame interface are available in the related art. The drive unit is screwed to the two opposite walls. In doing so, a gap between the drive unit and one of the walls usually needs to be bridged. In order to make this possible, a retaining plate may, for example, be provided on the drive unit, which retaining plate is elastically deformed to bridge the gap. However, this may adversely affect the mechanical loading and the tightness of the drive assembly.

SUMMARY

A drive assembly according to an example embodiment of the present invention is characterized in that in terms of loading, an advantageous mounting of a drive unit within a housing is enabled. Additionally, a particularly simple and cost-effective production and assembly of the drive assembly is enabled. This is achieved by a drive assembly comprising a drive unit and a frame interface. According to an example embodiment of the present invention, the drive unit is arranged at least partially between a first wall and a second wall of the frame interface. Preferably, the first wall and the second wall are connected to one another by means of a connecting wall so that, in particular, the first wall, the second wall and the connecting wall together form a one-piece U-shaped frame. The drive unit comprises a through-hole. Furthermore, the drive assembly comprises two sleeves inserted into the through-hole of the drive unit on both sides, i.e., at both ends of the through-hole, and a through-bolt inserted through the through-hole and the two sleeves. The through-bolt holds the drive unit on each of the two walls, in particular indirectly via the two sleeves.

In other words, a through-bolt connection is provided in the drive assembly and holds the drive unit to the frame interface by a through-bolt being inserted through the drive unit. This results in numerous advantages. On the one hand, this can result in a particularly simple assembly and disassembly of the drive assembly on or from the frame interface. For example, the through-bolt may be actuated, i.e., for example, inserted, rotated, or pulled out, on the side of one of the two walls. In the use on an electric bicycle, this is particularly advantageous due to the limited accessibility on the side of the chainring. The actuability of the through-bolt can accordingly be provided on the opposite side. Furthermore, a particularly robust connection can be achieved, in particular with regard to transverse loads, by using a through-bolt with a relatively large diameter. Slippage of a screw connection can thus also be avoided, for example. A desired loaded state of the drive unit can also be optimally adjusted as a result of the sleeves. For example, by a corresponding design of the sleeves, a neutral installed state of the drive unit can be provided, in which no axial forces act on the drive unit, in particular with respect to a longitudinal axis of the through-bolt. Alternatively, the sleeves can, for example, be designed such that, as a result of the clamping by means of the through-bolt, low or high compressive stress acts on the drive unit in the axial direction, which can advantageously affect a tightness of the drive unit against ingress of fluid. The sleeves also allow for an advantageous distribution of mechanical forces acting on the drive unit, in particular through an increased contact area of the drive unit and the fastening elements holding the drive unit to the frame interface. This is particularly advantageous when the drive unit or a housing of the drive unit is formed from aluminum or magnesium. The sleeves may, for example, be formed from a harder material, such as steel. As a result, a particularly stable fastening with reduced risk of damaging the drive unit or the housing thereof can be provided. Furthermore, the sleeves allow for a particularly simple adaptability, for example to different frame interfaces and/or to different degrees of tolerance of the frame interface.

Preferred developments and example embodiments of the present invention are disclosed herein.

Preferably, according to an example embodiment of the present invention, the two sleeves contact one another within the through-hole. By means of the through-bolt, the two sleeves are clamped against one another. As a result of the sleeves contacting one another in the through-hole, the axial forces that may occur due to the fastening to the frame interface can be absorbed by the sleeves so that the mechanical load on the drive unit is reduced.

Preferably, according to an example embodiment of the present invention, each sleeve comprises a shank and a flange. The shank is preferably hollow cylindrical and preferably, the flange is arranged at an axial end of the shank and has a larger outer diameter than the shank. The shank is arranged at least partially within the through-hole, and the flange is arranged outside the through-hole. In particular, the flange is designed to abut against an end face of the drive unit that surrounds the through-hole, and can accurately define an insertion depth of the shank of the sleeve. As a result, the desired mechanical load can be adjusted particularly simply and accurately.

It is particularly advantageous if the flange of the sleeves can be provided with different thicknesses, in particular with regard to the axial direction of the sleeve. For example, the flange of a sleeve of a first embodiment may have a first thickness, wherein the flange of a sleeve of a second embodiment may have a second thickness that is at least 1.5 times, preferably at least twice, in particular at least three times, the first thickness. This results in the advantage that the width of the drive assembly, preferably measured along an axial direction of the through-hole, is variable in a particularly simple and cost-effective manner. For example, the width of the drive assembly can be adapted to a frame interface of different width by varying the thickness of the flanges of the sleeves, so that the drive assembly can be used particularly flexibly and cost-effectively.

Particularly preferably, according to an example embodiment of the present invention, each sleeve comprises a damping element, which is arranged on a side of the flange that faces the drive unit. The damping element is formed from a vibration-damping material. Preferably, the damping element is formed from an elastomer. The damping element provides some damping effect through an elastic deformability between the flange and the drive unit. As a result, the drive assembly can be designed in a simple and cost-effective manner such that the drive unit is, for example, held without play in the axial direction of the through-hole by the damping element being deformed or partially compressed. Additionally, the damping element can reduce transmission of oscillations and vibrations between the drive unit and the frame interface. In addition, the damping element advantageously brings about a seal effect between the sleeve and the drive unit.

Preferably, according to an example embodiment of the present invention, the damping element additionally surrounds the shank at least partially, preferably completely, in the circumferential direction. In particular, the damping element is thus formed as an overmolding of the shank and of the side of the flange that faces the shank. The damping element thus offers the advantage of optimized fastening of the drive unit to the frame interface in terms of vibration mechanics. This has a particularly advantageous effect on a durability of the screw connections since the vibration-damping effect in particular reduces a transmission of oscillations and vibrations as well as changing dynamic loads due to the resilient and damping properties of the damping element. A changing mechanical load of the screw connection is thus also reduced or prevented, whereby high durability can be provided. Moreover, occurrence of unwanted noises can thereby be reduced, for example.

Furthermore, the damping element allows for some tolerance compensation. Moreover, there is the advantage of additional protection against corrosion, in particular galvanic corrosion, for example when the drive unit comprises a housing made of magnesium, wherein the sleeves are formed from aluminum, for example. Moreover, an axial and radial seal effect can be provided on the drive unit.

Particularly preferably, according to an example embodiment of the present invention, at an axial end opposite the flange, the damping element comprises a protruding sealing bead which protrudes axially and radially from the shank. In particular, the sealing bead protrudes axially and radially from the remaining regions of the damping element. For example, an annularly circumferential thickening of the damping element around the axial end of the damping element is considered a sealing bead. In particular, a protruding sealing bead is respectively provided on the damping element on both sleeves. The sealing bead offers the advantage of an improved seal against ingress of fluid. In particular, the sealing thus takes place in a contact plane of the shanks of the two sleeves contacting one another within the through-hole, and radially outside the shanks of the sleeves because the two sealing beads of the sleeves are pressed against one another in the axial direction. Additionally, the sealing beads are preferably designed to be radially pressed against an inner circumference of the through-hole. In particular, additional sealing elements, such as O-rings, between the through-screw and the sleeves can thus be omitted. This results in numerous advantages, such as cost savings, since a precise sealing contour is not required on the inner side of the sleeves. Moreover, simpler assembly of the drive assembly is possible.

Preferably, according to an example embodiment of the present invention, the sealing bead protrudes in the axial direction from an end face of the shank that is opposite the flange. In particular, such axial protrusion is at least 20% of a wall thickness of the shank in order to be able to provide reliable pressing and thus sealing.

Further preferably, the two sleeves are designed to be arranged at a predefined axial distance from one another in a state fully inserted into the through-hole and simultaneously unclamped within the through-hole. In other words, when the sleeves are inserted unclamped in the through-hole, a sum of the axial lengths of the sleeves is less than a total axial length of the through-hole.

Preferably, the predefined axial distance is designed such that in the clamped state of the two sleeves, which is brought about by the through-bolt, the axial distance is compensated due to elastic deformation of the damping element. That is to say, the sleeves contact one another within the through-hole. In other words, the two sleeves are designed in such a way that in the clamped state, when the two sleeves contact one another within the through-hole, the respective damping element of the two sleeves is elastically deformed, in particular pressed between the flange and the drive unit. As a result, a predetermined loaded state of the drive unit with minor predetermined compressive stress can be particularly easily adjusted. Moreover, sealing is reliably ensured by means of the deformed or compressed damping element. The sleeves contacting one another furthermore ensures absorption of the axial mechanical forces via the sleeves so that, for example, a screw connection of the through-bolt with high torque can be enabled without too high a mechanical load occurring on the drive unit. At the same time, a particularly stable screw connection can be made as a result.

Preferably, according to an example embodiment of the present invention, the flange of at least one of the two sleeves comprises a plurality of protruding form fit elements on a side facing the corresponding wall. The form fit elements are designed to be pressed into the wall as a result of the sleeve being screwed to the corresponding wall. By pressing into the wall, the form fit elements in particular cause plastic deformation of the wall, in particular in such a way that the form fit elements and the plastically deformed region of the wall form a form fit in a plane perpendicular to the screw axis. That is to say, on the surface of the flange, the sleeve comprises the protruding form fit elements that, as the sleeve and the wall are screwed together, partially dig into the wall, in particular in order to produce, in the plane of the wall surface, a micro form fit. As a result, a particularly firm connection of the drive unit to the frame interface can be provided since slippage between the sleeve and the wall can be reliably prevented in a simple manner.

Particularly preferably, according to an example embodiment of the present invention, the flange of the sleeve is formed in two parts and comprises a flange base body and an insert ring. The flange base body is designed, together with the shank of the sleeve, as a one-piece component. The form fit elements are arranged, preferably exclusively, on the insert ring. That is to say, the insert ring with the form fit elements is provided as a separate component from the remaining sleeve. This in particular results in advantages in terms of manufacturing technology since a significantly higher flexibility in the geometry and choice of materials of the sleeves and the form fit elements is enabled. Preferably, the insert ring is immovably fixed to the flange base body.

Preferably, according to an example embodiment of the present invention, the insert ring is arranged in a groove, in particular an annular groove, of the flange base body. This results in a simple and accurately defined relative arrangement of the insert ring and the flange base body for optimal positioning of the form fit elements. Preferably, the insert ring is held in the groove by means of an axial form fit. That is to say, in the axial direction of the sleeve, at least sub-regions of the insert ring and of the flange base body undercut one another in such a way that the insert ring is reliably held in the groove. For example, the axial form fit can be designed in the form of a peening, for example through plastically deformed sub-regions, of the flange base body. Simple and cost-effective production of the sleeves can thus be enabled.

Preferably, the flange base body and the insert ring are formed from different materials. It is particularly advantageous for the insert ring to have a greater hardness than the flange base body. Preferably, the flange base body, as well as preferably also the shank of the sleeve, is formed from a steel that is well-suited for cold forming. As a result, simple and cost-effective producibility of the sleeves can be enabled. Further preferably, the insert ring is formed from a hardened steel. As a result, a particularly stable geometry of the form fit elements can be provided, thereby achieving its function particularly reliably.

Preferably, each form fit element comprises a pyramid protruding from a surface of the flange of the sleeve. Alternatively, each form fit element comprises a cone protruding from a surface of the flange of the sleeve, for example. In other words, a plurality of pyramid tips protruding from the surface of the flange are provided as form fit elements. Particularly preferably, the pyramids are pointed and in particular have an opening angle of less than 60°, preferably less than 45°, so that they can particularly easily penetrate into the wall. Such a design with pointed pyramids as form fit elements is particularly advantageous for the screw connection of the drive unit to carbon frames, i.e., to frame interfaces that consist at least partially of a fiber-reinforced, preferably carbon fiber-reinforced, plastic. This results in the advantage that the pointed pyramids can press into the mesh structure of the carbon without damaging the latter. In particular, as the pyramids penetrate, the fibers are not broken but can yield and lie around the respective pyramid.

Further preferably, in the surface of the flange, each form fit element comprises a depression adjacent to the pyramid, for example, surrounding the pyramid. Preferably, the depression is designed as an annular groove. Particularly preferably, a single depression is formed in the surface of the flange, the pyramids being arranged on the radial inner side and/or outer side of said depression. Alternatively, a separate depression can be formed per pyramid, wherein the depression is in particular arranged directly adjacent to the pyramid. The depression can, for example, receive the material of the wall that is displaced by the penetration of the pyramid into the wall, in order to enable a reliable and defined abutment of the surface of the flange against the wall.

Preferably, according to an example embodiment of the present invention, the flange of at least one of the two sleeves comprises a taper at a radially outer end. The flange is preferably disk-shaped. The taper is arranged on the side of the flange that faces the shank. A reduction of the thickness of the flange, in particular in the axial direction of the sleeve, is in particular considered to be a taper. In particular, the taper corresponds to a difference of the maximum thickness and the minimum thickness of the flange, wherein this difference preferably corresponds to at least 50%, preferably at most 150%, of a wall thickness of the shank of the sleeve. The taper of the flange is in this case compensated by the damping element. In other words, a thickness of the damping element in the region of the taper is greater than in the remaining region of the flange. Preferably, an overall thickness of the damping sleeve is constant in the axial direction in the region of the flange. Alternatively, the damping element may preferably comprise a thickening on a radially outer end of the side facing the shank. By the taper of the flange and the thicker damping element in this region, a softer zone of the damping sleeve can be provided in this region and enables a particularly good seal effect between the damping sleeve and the drive unit.

Further preferably, the drive unit comprises at least one protruding annular rib, which is arranged concentrically with one of the two openings. Preferably, the annular rib has a conical or trapezoidal cross-section. Particularly preferably, the protruding annular rib and the taper of the flange of the sleeve are arranged on the same radius with respect to an opening axis of the opening of the drive unit. In other words, the protruding annular rib and the taper of the flange of the sleeve are arranged at the same height relative to the radial direction of the opening of the drive unit. The protruding annular rib can thus optimally dip into the thicker region of the damping element during the assembly of the drive assembly, whereby a particularly good seal effect can be provided between the damping sleeve and the drive unit.

Preferably, the through-bolt is fastened to the second wall. In so doing, the through-bolt clamps the two sleeves and the second wall against one another. In particular, the through-bolt clamps the two sleeves between a bolt head and the second wall. In so doing, the through-bolt is held axially movably on the first wall. In particular, the through-bolt is held immovably, in particular substantially immovably, in a radial direction on the first wall, for example by being at least partially arranged within a through-opening of the first wall. As a result, tolerance compensation between the frame interface with the two walls and the drive unit can take place in a particularly simple manner since the axially movable mounting of the through-bolt on the first wall acts as a floating bearing while the fastening to the second wall acts as a fixed bearing.

Further preferably, according to an example embodiment of the present invention, the drive assembly furthermore comprises a tolerance compensation element. The first wall also comprises a wall opening. The tolerance compensation element is formed in the shape of a sleeve and is arranged within the first wall opening. The through-bolt comprises a bolt head, which is arranged within the tolerance compensation element. In particular, the tolerance compensation element is provided to enable an arrangement without play between the bolt head and the first wall in the radial direction of the wall opening. Alternatively, a bolt shank of the through-bolt may preferably be arranged within the tolerance compensation element, wherein the through-bolt, together with the tolerance compensation element, is in this case preferably movable axially relative to the first wall. By providing a tolerance compensation element as an additional component, the tolerance compensation can be carried out in a manner that is particularly simple and precisely adapted to the respective tolerance situation.

Particularly preferably, the tolerance compensation element comprises a sliding bearing bushing and a damping shell, wherein the damping shell surrounds the sliding bearing bushing. For example, the damping shell may completely surround the sliding bearing bushing in the circumferential direction. Alternatively, the damping shell may preferably comprise one or more cutouts. Preferably, the sliding bearing bushing is thus arranged radially inside. This provides for a low-friction sliding contact between the bolt head and the tolerance compensation element, whereby unintended axial clamping between the through-bolt and the first wall can be particularly reliably avoided. The damping shell can prevent or reduce vibration transmission between the first wall and the bolt head on the one hand and can ensure reliable fastening of the tolerance compensation element in the wall opening on the other hand. Preferably, the damping shell is formed from an elastomer.

Preferably, the sliding bearing bushing and the bolt head are designed such that the bolt head widens the sliding bearing bushing in the radial direction when the bolt head is arranged within the tolerance compensation element, in particular in a fully clamped state. For example, this can be achieved by means of a corresponding fit between the bolt head and the sliding bearing bushing. The sliding bearing bushing is preferably designed to be tapered toward the drive unit at the inner circumference thereof, wherein the bolt head has a larger diameter. This achieves that the tolerance compensation element is radially pressed into the wall opening of the first wall by the bolt head, whereby a particularly reliable, firm mounting is enabled. Moreover, a radial tolerance can thereby be reduced to zero.

Preferably, the sliding bearing bushing is slotted. The radial widening can thereby be brought about particularly simply and selectively. Moreover, pressing of the tolerance compensation element into the wall opening can thereby be facilitated.

Preferably, according to an example embodiment of the present invention, the slot of the sliding bearing bushing is arranged obliquely with respect to an axial direction of the sliding bearing bushing, in particular when looking at the slot from a radial direction. This can provide an optimal, even, mechanical support around the entire circumference and over the entire axial length of the sliding bearing bushing.

Particularly preferably, the damping shell comprises at least one sealing lip on a radially outer side. The at least one sealing lip is preferably arranged at an axial end of the damping shell. Preferably, a respective sealing lip is arranged at both axial ends. The at least one sealing lip is designed such that there is an axial form fit between the damping shell and the first wall when the tolerance compensation element is arranged within the first wall opening. In other words, the tolerance compensation element can be clipped into the first wall opening by means of the sealing lip. As a result, a particularly simple and reliable mounting of the tolerance compensation element can be achieved. Moreover, a particularly reliable seal effect is provided at the first wall opening.

Particularly preferably, according to an example embodiment of the present invention, the damping shell is designed such that the at least one sealing lip is pushed radially outward by the bolt head when the bolt head of the through-bolt is located within the tolerance compensation element. Preferably, a further sealing lip protrudes from the radially inner side of the tolerance compensation element and is pushed radially outward by the bolt head in order to thus also push the radially outer sealing lip outward. Preferably, these two sealing lips are arranged on the side of the tolerance compensation element that faces the drive unit. This ensures that the sealing lip is always positioned toward the drive unit and radially outward. For example, this also prevents a portion of the sealing lip from moving inward in the direction of the sliding bearing bushing as a result of frictional forces.

Preferably, the sliding bearing bushing comprises a radially outward protruding detent lug at at least one axial end, preferably at both axial ends. In particular, the detent lug protrudes radially outward from a cylindrical base body of the sliding bearing bushing. The detent lug can enable reliable fastening of the tolerance compensation element in the wall opening of the first wall, in particular by a form fit between the detent lug of the sliding bearing bushing and the first wall. Preferably, the sliding bearing bushing may be compressed by the slot during assembly, in order to enable simple assembly. The detent lug may preferably extend around the entire circumference of the sliding bearing bushing or, alternatively, preferably only over a portion of the circumference.

Preferably, the through-bolt is fastened to the second wall, in particular by means of a screw connection. In so doing, the through-bolt clamps the two sleeves and the second wall against one another. Moreover, the through-bolt is retained to the first wall by means of a retaining element. The retaining element fixes the through-bolt to the first wall in the radial direction. In particular, the retaining element centers the through-bolt relative to a wall opening of the first wall. In other words, the retaining element provided is an additional component that provides radial tolerance compensation for the through-bolt on the first wall. This enables particularly precise fastening with the least tolerances.

Preferably, according to an example embodiment of the present invention, the retaining element comprises an external thread by means of which the retaining element is screwed into an internal thread of the wall opening of the first wall. The retaining element also comprises a retaining opening in which a bolt head of the through-bolt is held. The retaining opening is designed to widen toward the second wall. Alternatively or additionally, the bolt head of the through-bolt is designed to taper toward the first wall. Preferably, the widening of the wall opening and/or the taper of the bolt head is conical. In the event that the wall opening and the bolt head are designed to widen and taper, respectively, they preferably have an identical cone angle. As a result of the widening or taper, the radial fixation of the through-bolt to the first wall can take place in a particularly simple manner and precisely, in particular in such a way that precise centering relative to the first wall opening is additionally achieved.

Preferably, the bolt head of the through-bolt is arranged in a wall opening of the first wall. The bolt head particularly preferably comprises an external thread onto which the retaining element is screwed, in particular by means of an internal thread of the retaining element. In this case, the retaining element comprises a lateral surface which tapers toward the second wall. Alternatively or additionally, the wall opening of the first wall is designed to taper toward the second wall. Preferably, the taper of the lateral surface and/or of the wall opening is designed as a conical taper. In the event that both the lateral surface of the retaining element and the wall opening are designed to taper, the corresponding conical tapers preferably have an identical cone angle. By means of the taper(s), the radial fixation of the through-bolt to the first wall can take place in a particularly simple manner and precisely by screwing the retaining element onto the bolt head, in particular in such a way that precise centering of the bolt with the retaining element relative to the wall opening is additionally achieved.

Preferably, the retaining element is formed on a plastic and/or comprises a rubber element and/or plastic element on its contact surface with the bolt head. This can prevent noise development, for example, creaking, of the drive assembly during operation thereof.

Further preferably, each sleeve comprises a press region. A press fit is formed between the press region and the through-hole. A particularly reliable and defined mounting and power transmission between the sleeves and the drive unit is thus enabled.

Preferably, according to an example embodiment of the present invention, the press region is arranged, in particular directly, adjacent to the flange. The shank of each sleeve additionally comprises a taper region that has a smaller outer diameter than the press region. In particular, the taper region is thus arranged on a side of the press region that is opposite the flange. This enables the taper region to be simply and smoothly inserted into the through-hole of the drive unit in order to enable simple insertion of the sleeves into the through-hole.

Preferably, the through-hole comprises a centering region which is arranged centrally in the through-hole and has a smaller inner diameter than the rest of the through-hole. The centering region is provided for centering the two sleeves within the through-hole, in particular by means of the respective taper regions. Preferably, a clearance fit is formed between each taper region and the centering region so that smooth insertion of the sleeves is possible, but the centering regions are oriented precisely centrally in the through-hole for an optimal orientation of the two sleeves.

Particularly preferably, the through-bolt is designed as a screw and screwed into an internal thread of the second wall. As a result, a particularly simple, cost-effective drive assembly that is lightweight due to fewer components can be provided.

Preferably, the through-bolt is formed as a screw and screwed into a nut arranged on the second wall. As a result, a particularly robust screw connection can be provided since, for example, through-bolts and nuts can be formed from a harder material than the frame interface. For example, by using through-bolts and nuts made of steel, a particularly high torque can be used for the screwing process. Moreover, in the event of damage to the internal thread, the nut can simply be replaced. The use of a nut also has the further advantage that it constitutes tolerance compensation relative to the wall opening of the first wall due to a radially specified clearance and thus always aligns exactly.

Preferably, the nut is arranged in a torsion-proof manner in a recess of the second wall. For example, the nut and the recess can have a non-circular geometry, for example in the form of tangential flat portions, in particular with respect to an axis of a through-opening through the second wall. As a result, a particularly simple assembly of the drive assembly can be enabled.

Further preferably, according to an example embodiment of the present invention, the flange of at least one sleeve has a predetermined thickness, in particular in the direction parallel to a longitudinal direction of the sleeve, which is substantially equal to a wall thickness of the shank, in particular in the radial direction. Alternatively, the flange of at least one sleeve preferably has a predetermined thickness, in particular in the direction parallel to a longitudinal direction of the sleeve, which is at least 1.5 times, preferably at least twice, particularly preferably at least three times, a wall thickness of the shank, in particular in the radial direction. A variable width of the drive assembly can thus be provided, which allows an adaptation to a frame interface of different width in a particularly simple and cost-effective manner.

Preferably, according to an example embodiment of the present invention, the drive unit comprises a motor and/or a transmission. The particular arrangement and mounting between the walls of the frame interface can provide an optimal reliable connection with advantageous mechanical force distribution in order to enable a long service life of the drive unit. Moreover, a low weight of the drive assembly can be enabled in a simple and cost-effective manner.

Furthermore, the present invention provides a vehicle, preferably a vehicle operable with muscular power and/or motor power, preferably an electric bicycle comprising the described drive assembly according to the present invention. For example, the frame interface may be part of a vehicle frame of the vehicle.

Preferably, the vehicle comprises a vehicle frame. The frame interface of the drive assembly is an integral part of the vehicle frame, i.e., the vehicle frame is formed with the frame interface as a one-piece component, wherein the drive unit is preferably directly connected to the frame interface, i.e., in particular without additional intermediate components.

Alternatively, the frame interface of the drive assembly and/or one or both of the walls of the frame interface is preferably designed as a separate component from the vehicle frame and connected, preferably screwed, to the vehicle frame. The drive unit can thus be indirectly fastened to the frame interface, for example.

Particularly preferably, according to an example embodiment of the present invention, the vehicle furthermore comprises a chainring connected to an output shaft of the drive unit. In this case, the second wall of the drive assembly is arranged on the side of the chainring. In particular, if a fastening on the second wall is designed as a fixed bearing and a fastening on the first wall is designed as a floating bearing, an optimal direct force transmission between the drive unit and the chainring can take place as a result. Moreover, precise positioning of the chainring, i.e., of an accurate chainline, is ensured.

BRIEF DESCRIPTION OF THE DRAWINGS

The present invention is described below based on exemplary embodiments in connection with the figures. In the figures, functionally identical components are respectively denoted by identical reference signs.

DETAILED DESCRIPTION OF EXAMPLE EMBODIMENTS

Figure 1:
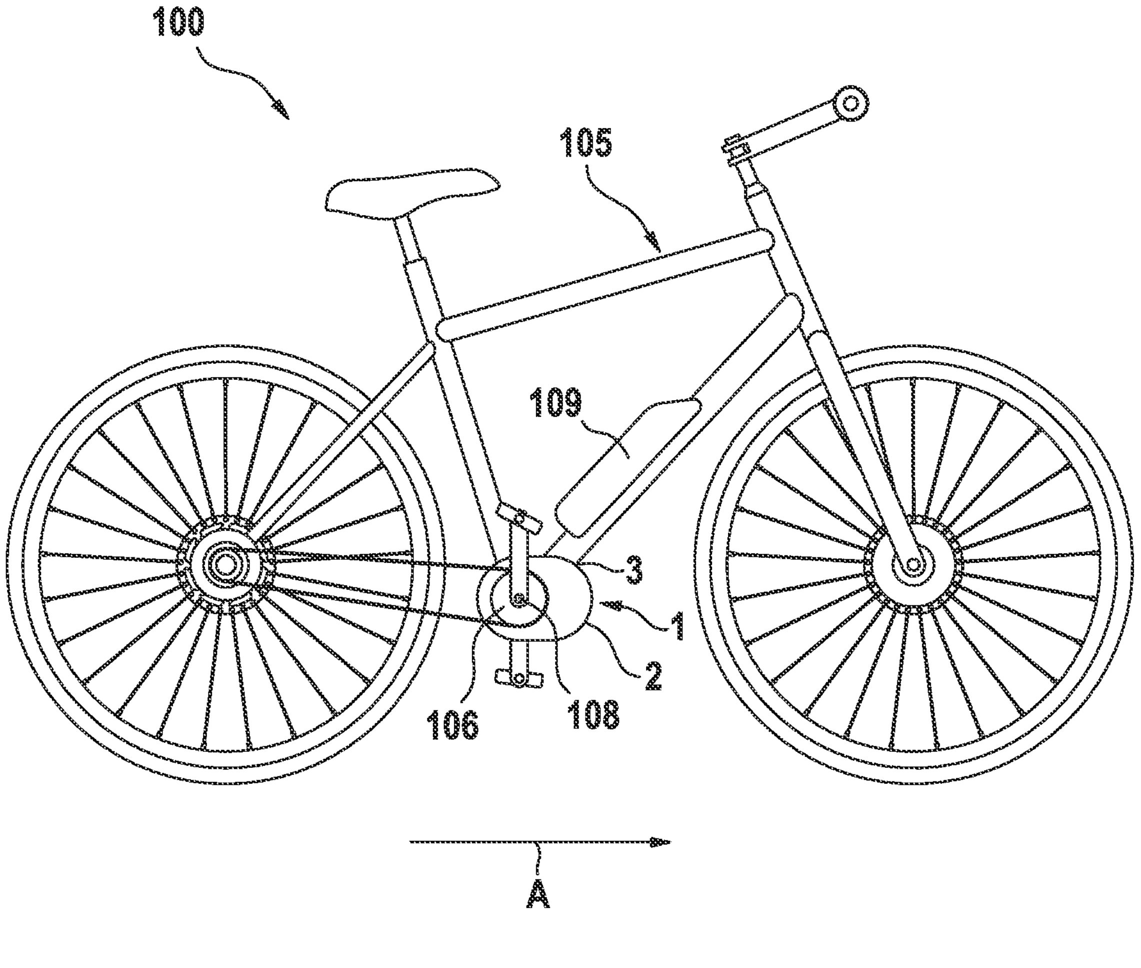
FIG. 1 shows a simplified schematic view of a vehicle comprising a drive assembly according to a first exemplary embodiment of the present invention.

FIG. 1 shows a simplified schematic view of a vehicle 100 operable with muscular power and/or motor power and comprising a drive assembly 1 according to a first exemplary embodiment of the present invention. The vehicle 100 is an electric bicycle. The drive assembly 1 is arranged in the region of a bottom bracket and comprises a drive unit 2. The drive unit 2 comprises an electric motor and a transmission and is provided to support the rider's pedal force generated by muscular power, by means of a torque generated by the electric motor. The drive unit 2 is supplied with electrical power by an electrical energy store 109.

Figure 2A:
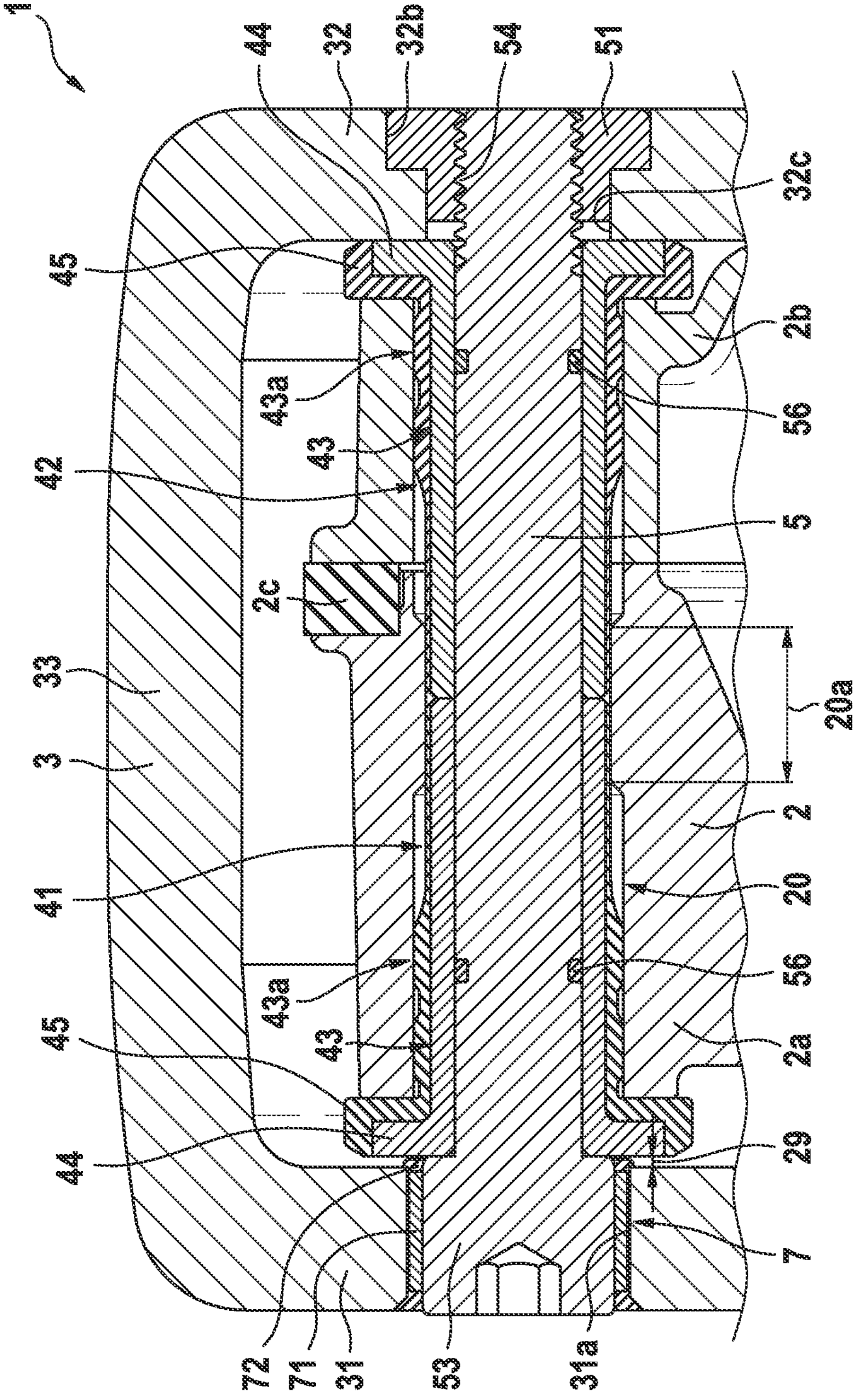
FIG. 2A shows a sectional view of the drive assembly of FIG. 1 in the fully screwed state.

The drive assembly 1 of the first exemplary embodiment is shown in a sectional view in FIG. 2A. The drive assembly 1 comprises a U-shaped frame interface 3 within which the drive unit 2 is partially received. The frame interface 3 is an integral part of a vehicle frame 105 of the vehicle 100 (cf. FIG. 1). The frame interface 3 comprises a first wall 31 and a second wall 32, between which the drive unit 2 is arranged. The first wall 31 and the second wall 32 are connected to one another via a connecting wall 33 and thus formed as a common one-piece component.

The drive unit 2 is fastened to the frame interface 3 by means of a through-screw connection, as described in more detail below.

Specifically, the drive unit 2 comprises a through-hole 20 that fully penetrates the drive unit 2 in the transverse direction. In particular, the through-hole 20 is formed in a housing, which is preferably formed from aluminum or magnesium, of the drive unit 2. The housing of the drive unit 2 can be formed in two parts, wherein a housing seal 2*c* is arranged between the two housing halves 2*a*, 2*b*.

Two sleeves 41, 42 are inserted into the through-hole 20. The two sleeves 41, 42 are inserted into the through-hole 20 starting from a respective side, i.e., at an axial end of the through-hole 20. The sleeves 41, 42 are preferably formed from aluminum or steel.

Each sleeve 41, 42 comprises a shank 43, which is substantially hollow cylindrical and is inserted into the through-hole 20, and a flange 44. The flange 44 is arranged outside the through-hole and has a larger outer diameter than the shank 43.

The shank 43 comprises a press region 43*a*, which is arranged directly adjacent to the flange 44. The press region 43*a* is designed such that a press fit is formed between the press region 43*a* and the through-hole 20.

Formed centrally in the through-hole 20 is a taper region 20*a*, in which an inner diameter of the through-hole 20 is tapered. Between the taper region 20*a* and the sleeves 41, 42, a clearance fit is preferably formed. As a result, the taper region 20*a* brings about a centering of the sleeves 41, 42 and thus a particularly precise arrangement of the sleeves 41, 42.

Preferably, the two sleeves 41, 42 are identical for a simple and cost-effective production.

Axial lengths of the sleeves 41, 42, in particular of the shank 43 in each case, are designed in such a way that the sleeves 41, 42 contact one another within the through-hole 20 in the inserted and fully screwed state (as described later).

Moreover, the drive assembly 1 comprises a through-bolt 5, which is inserted through the through-hole 20 and the two sleeves 41, 42. The through-bolt 5 is designed as a screw and comprises a bolt head 53 at one axial end and an external thread 54 at the other axial end, wherein the external thread 54 extends only over a sub-region of the through-bolt 5.

By means of the external thread 54, the through-bolt 5 is screwed into a nut 51 on the second wall 32. The bolt head 53 is located on the side of the first wall 31 and in particular abuts against an outer side of the first wall 31.

Preferably, a clearance fit is respectively formed between the through-bolt 5 and an inner through-opening of the sleeves 41, 42 in order to enable simple insertion. At the regions of the through-bolt 5, within each sleeve 41, 42, a seal, for example an O-ring seal 56, is preferably respectively arranged between the through-bolt 5 and the sleeve 41 or 42 in order to avoid ingress of fluid into the interior of the sleeves 41, 42 and into the interior of the through-hole 20.

The through-bolt 5 is screwed in such a way that it clamps the two sleeves 41, 42 in the axial direction of the through-bolt 5 against the second wall 32. The sleeves 41, 42 ensure that this clamping does not lead to any or leads to an accurately defined compressive load of the drive unit 2 in the axial direction between the flanges 44 of the two sleeves 41, 42. In particular, a tensile load of the drive unit 2 is avoided as a result of the two sleeves 41, 42.

The particular through-screw connection of the drive assembly 1 offers numerous advantages. For example, the use of the through-bolt 5 allows for a particularly robust fastening of the drive unit 2. In particular, a screwing process can take place with high torque. By absorbing high compressive forces by means of the sleeves 41, 42, impermissibly high mechanical stress on the drive unit 2 is particularly reliably avoided. Moreover, by adapting the sleeves 41, 42, for example, a tolerance situation of the drive assembly 1 can be simply and cost-effectively adjusted in a defined manner. Furthermore, the through-screw connection allows particularly simple assembly of the drive assembly 1 since the insertion of the through-bolt 5 and actuation of the through-bolt 5 for the screwing-in process can only be carried out from one side, namely from the side of the first wall 31. This is in particular advantageous in the case of limited accessibility on the side of the second wall 32, for example, if there is a chainring 106 on this side (compare FIG. 1).

Additionally, each sleeve 41, 42 comprises a damping element 45 formed from an elastic and vibration-damping material. In particular, the damping element 45 is formed from an elastomer. Specifically, a radially outer side of the shank 43, of the flange 44, as well as the side of the flange 44 that faces the drive unit 2 are respectively covered or coated with the damping element 45. Preferably, the damping element 45 is thus designed in the form of an overmolding of the sleeve 41, 42.

Figure 2B:
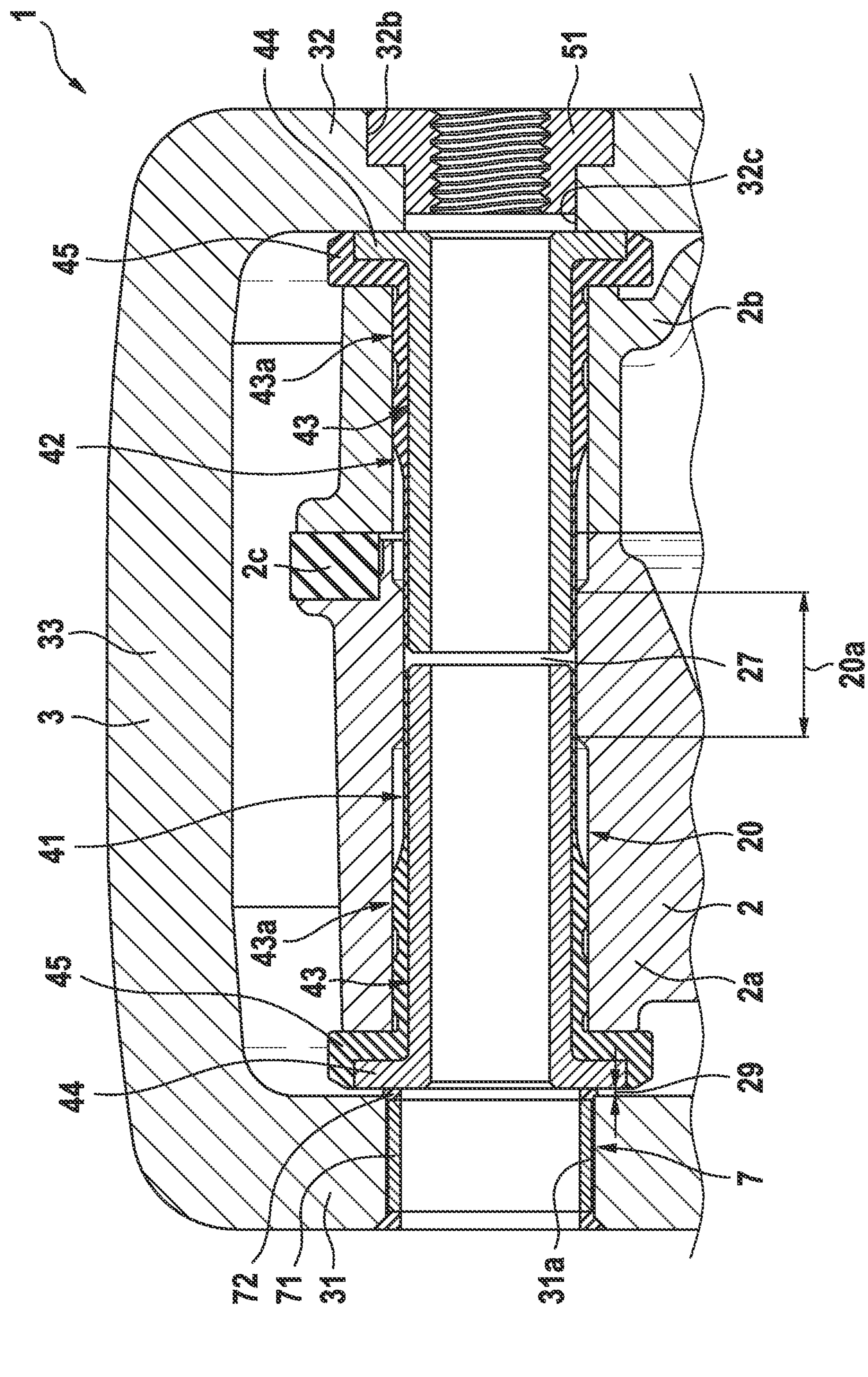
FIG. 2B shows a sectional view of the drive assembly of FIG. 1 before the screwing process.

Furthermore, the axial lengths of the shanks 43 of the sleeves 41, 42 are designed in such a way that in the state fully inserted into the through-hole 20 and not yet clamped by the through-bolt 5, as shown in FIG. 2B, there is a predefined axial distance 27, i.e., a gap, between the two sleeves 41, 42 in the interior of the through-hole 20. Considered in this case is a state in which the two sleeves 41, 42 are unclamped but the damping element 45 abuts against the drive unit 2 in the region of each flange 44 of each sleeve 41, 42. In particular, the axial lengths of the two shanks 43 are smaller than half of the axial length of the through-hole 20 by a predetermined difference, wherein the predetermined difference is smaller than double the thickness of one of the damping elements 45 in the region of the flange 44.

In the fully screwed state shown in FIG. 2A, there is a predefined gap 29 between the first wall 31 and the first sleeve 41.

This particular coordination of the lengths of the two sleeves 41, 42 and of the through-hole 20 achieves that the respective part of the damping element 45 of each sleeve 41, 42 that is located between the flange 44 and the drive unit 2 is partially compressed or clamped between the flange 44 and the drive unit 2 by the clamping by means of the through-bolt 5 and thereby elastically deformed.

The damping elements 45 and the corresponding design of the sleeves 41, 42 with axial distance in the unclamped state result in a slight compressive load being exerted on the drive unit 2 in the clamped state. This may advantageously affect a tightness of the drive unit 2 itself. Moreover, the elastic deformation of the damping elements 45 enables a particularly reliable seal between the sleeves 41, 42 and the drive unit 2.

FIG. 1 also shows an output shaft 108, which is rotationally fixedly connected to a chainring 106. The output shaft 108 can in this case be driven by the muscular power of the rider on the one hand and by the motor power of the drive unit 2 on the other hand. The chainring 106 is located on the side of the second wall 32. As already mentioned above, this results in the advantageous accessibility and simplified assembly of the drive assembly 1. Furthermore, this results in the advantage of direct force transmission between the output shaft 108 and the frame interface 3, which can be particularly well absorbed by the direct and robust connection by means of the second wall 32 due to the higher mechanical forces on the chainring side. Moreover, this ensures a defined position of the chainring 106 relative to an axial direction of the output shaft 108 and relative to the frame interface 3, which provides the advantage of a reliably precisely arranged chainline.

Furthermore, connecting the drive unit 2 and the frame interface 3 via the damping elements 45 results in the advantage of a vibration-decoupled mounting of the drive unit 2 to the vehicle 100. In addition to preventing or reducing a transmission of acoustic vibrations, which has an advantageously effect on noise reduction during operation of the vehicle 100, a transmission of mechanical vibrations is also reduced or prevented. A damaging effect of such vibrations on the screw connection can thus be prevented or reduced. That is to say, loosening or unscrewing the screw connection can be prevented or reduced. Moreover, as a result of the elasticity of the damping element 45 itself, some tolerance compensation can take place, for example with respect to a coaxiality of the bores or openings, or the like.

Additionally, an axially movable mounting of the through-bolt 5 is provided on the first wall 31. The bolt head 53 of the through-bolt 5 is located within a wall opening 31*a* of the first wall 31. Deformation of the first wall 31 is thus not provided, but a particularly stiff and robust frame interface 3 can be provided.

The axially movable mounting is achieved by means of a tolerance compensation element 7. This mounting with the tolerance compensation element 7 is shown enlarged in FIG. 3. The tolerance compensation element 7 comprises a hollow cylindrical sliding bearing bushing 71 and a damping shell 72. The damping shell 72 is in particular formed from an elastic material, preferably an elastomer. The damping shell 72 substantially completely surrounds a radially outer side of the sliding bearing bushing 71, wherein recesses (not shown) can also be provided in the damping shell 72, for example. Additionally, the damping shell at least partially covers both axial end faces of the sliding bearing bushing 71. On the radially inner side, the sliding bearing bushing 71 is exposed so that the bolt head 53 can move smoothly with low friction relative to the tolerance compensation element 7.

The sliding bearing bushing 71 may preferably be formed from a solid material along the circumferential direction or may alternatively be slotted, i.e., with a longitudinal slot in the axial direction. In both cases, the sliding bearing bushing 71 is preferably designed in such a way that by screwing-in the through-bolt 5 and thus by the bolt head 53 penetrating into the sliding bearing bushing 71, the sliding bearing bushing 71 is widened in the radial direction so that a press fit is produced between the tolerance compensation element 7 and the wall opening 31*a*. As a result, a mounting of the bolt head 53 in the radial direction without play can be enabled within the wall opening 31*a*.

Figure 3:
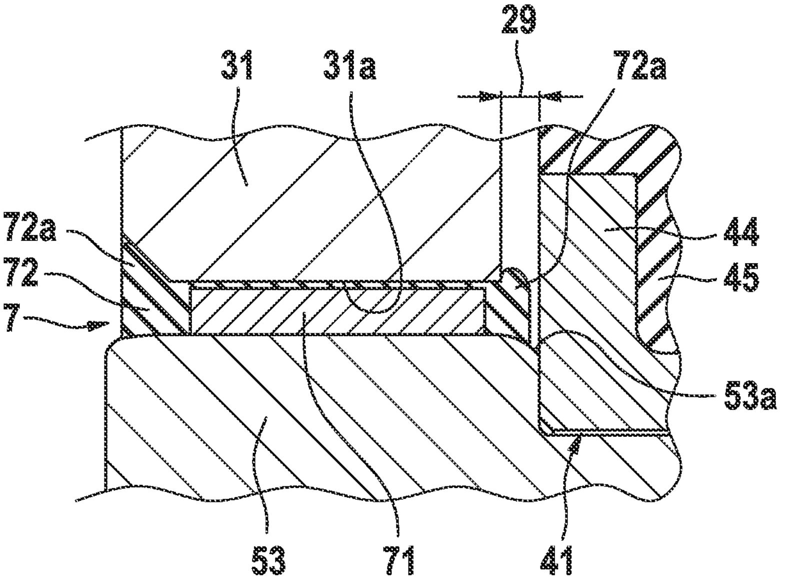
FIG. 3 shows a detail of FIG. 2A.

The gap 29 between the first wall 31 and the first sleeve 41 is in this case present both in the unscrewed state and in the fully screwed state (cf. FIGS. 2A and 3).

Preferably, on a side facing the sleeve 41, the bolt head 53 comprises an insertion chamfer 53*a* (compare FIG. 3), which facilitates the insertion and screwing-in of the through-bolt 5.

At the two axial ends, the damping shell 72 comprises a respective sealing lip 72*a*, which is formed as a lip protruding both radially inward and radially outward. As a result of the elasticity of the damping shell 72, the bolt head 53 pushes the sealing lips 72*a* radially outward as the through-bolt 5 is screwed in. This results in a reliable and defined seal between the first wall 31 and the tolerance compensation element 7 as well as between the bolt head 53 and the tolerance compensation element 7. Furthermore, the sealing lips 72*a* bring about an axial form fit of the tolerance compensation element 7 with the first wall 31. This ensures reliable and defined arrangement of the tolerance compensation element 7 relative to the first wall 31.

Figure 4:
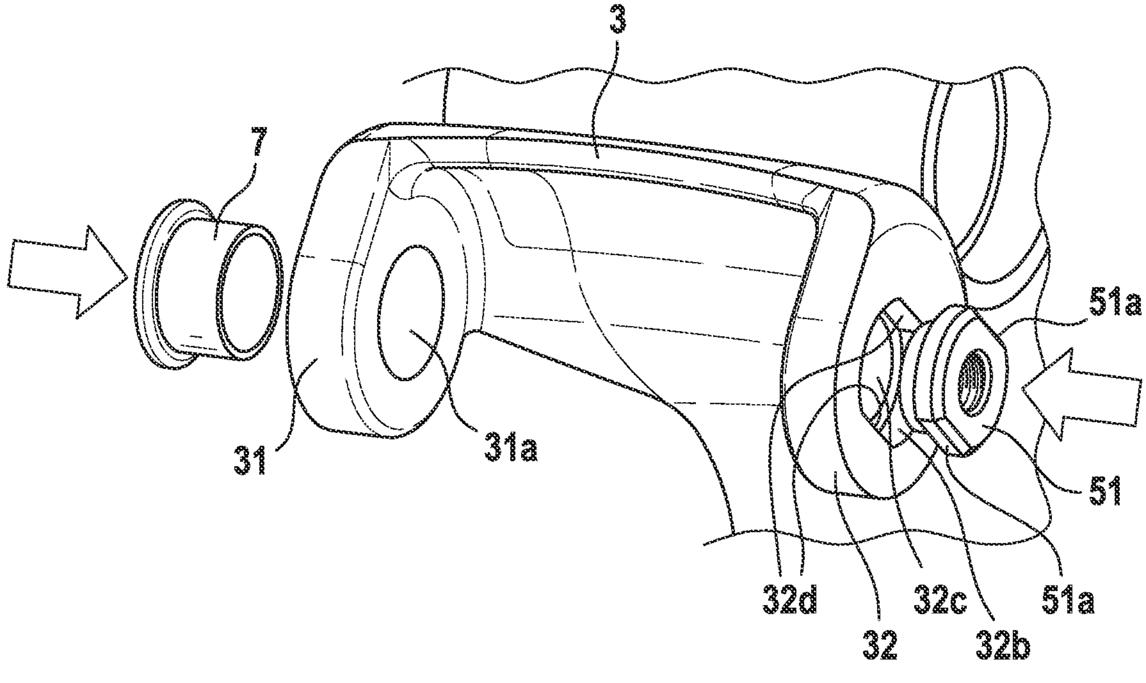
FIG. 4 shows a perspective detailed view of an assembly of the drive assembly of FIG. 2A.

As shown in FIG. 4, prior to arranging the drive unit 2, the tolerance compensation element 7 can preferably be inserted into the wall opening 31*a* of the first wall 31 from outside, i.e., from outside the frame interface 3, in particular be clipped-in by the sealing lips 72*a* by means of a minor form fit.

Additionally, the screw connection of the through-bolt 5 on the second wall 32 in the first exemplary embodiment is formed by means of a nut 51. The through-bolt 5 is in this case screwed into the nut 51 on the second wall 32. The nut 51 can preferably be formed from steel, as preferably also the through-bolt 5, in order to enable a particularly firm screw connection with high torque.

The nut 51 is arranged in a torsion-proof manner in a recess 32*b* of the second wall 32. Preferably, the recess 32*b* is an external radial expansion of a circular second wall opening 32*c* penetrating through the second wall 32. As can be seen in FIG. 4, the recess 32*b* comprises two opposite flat portions 32*d*, i.e., two straight and parallel walls arranged in the tangential direction. The nut 51 has a corresponding geometry with two opposite flat portions 51*a*. The flat portions 32*d*, 51*a* cause the nut 51 in the second wall 32 to not be able to twist, for example as the through-bolt 5 is screwed in, which enables a particularly simple and fast assembly of the drive assembly 1.

Moreover, the nut 51 is T-shaped in a sectional view. As a result, a maximum thread length can be provided with optimal compactness of the entire drive assembly 1 in order to enable a firm and reliable screw connection with the through-bolt 5.

Figure 5:
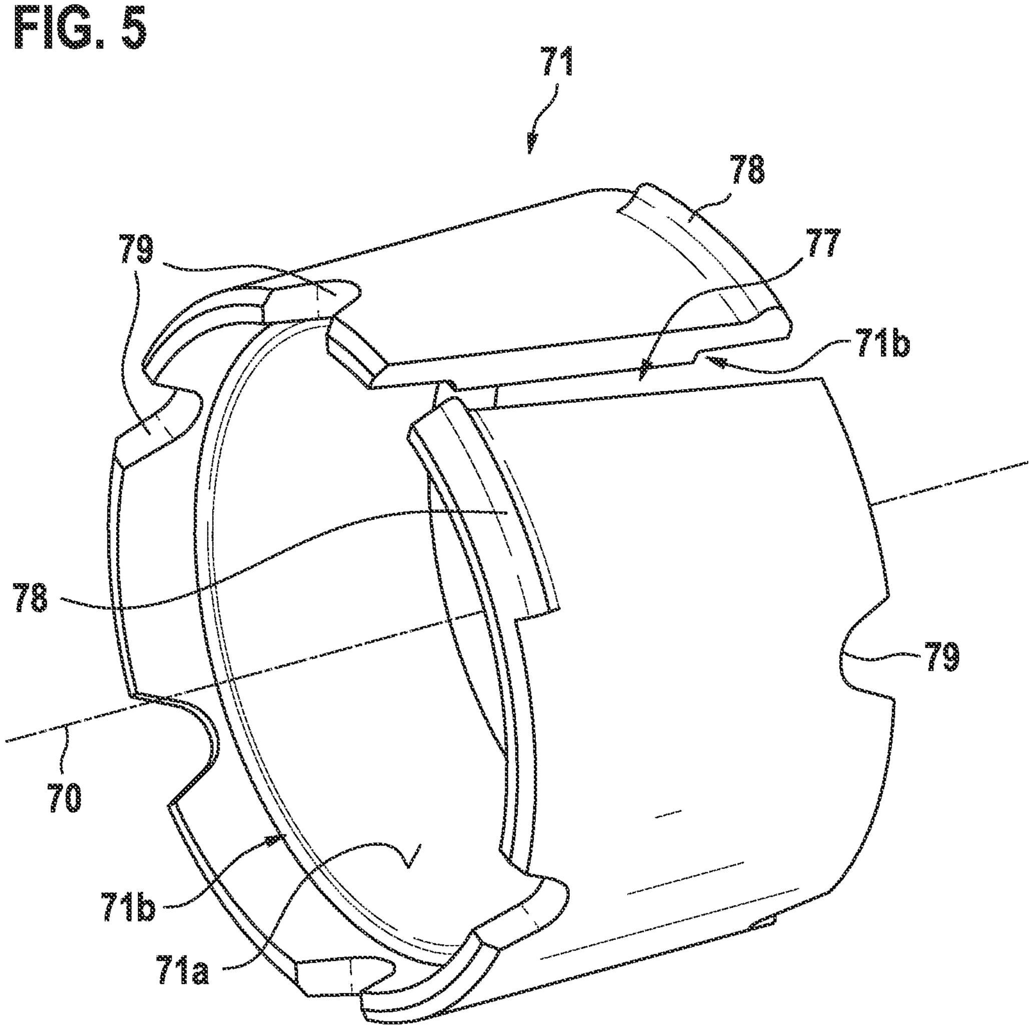
FIG. 5 shows a perspective detailed view of a tolerance compensation element of a drive assembly according to a second exemplary embodiment of the present invention.

FIG. 5 shows a perspective detailed view of a tolerance compensation element 7 of a drive assembly 1 according to a second exemplary embodiment of the present invention. The second exemplary embodiment substantially corresponds to the first exemplary embodiment of FIGS. 1 to 4, with the difference that the sliding bearing bushing 71 of the tolerance compensation element 7 has an alternative design. The sliding bearing bushing 71 is shown in the perspective view of FIG. 5.

The sliding bearing bushing 71 comprises a longitudinal slot 77, which fully penetrates through the substantially hollow cylindrical sliding bearing bushing 71 in the axial direction and in the radial direction. The longitudinal slot 77 is arranged obliquely with respect to a longitudinal axis 70 of the sliding bearing bushing 71, i.e., it extends along a line which, in a radial projection onto a plane of the longitudinal axis 70, is arranged at an angle of preferably at least 5°, preferably at most 45°, to the longitudinal axis 70. Optimal mechanical support around the entire circumference of the sliding bearing bushing 71 can thereby be provided since, for example, there is no or only a slight interruption of the projected support surface between the bolt head 53 and the first wall 31. This may, for example, enable better coaxial positioning accuracy of the drive unit 2 relative to the frame interface 3.

The sliding bearing bushing 71 of FIG. 5 also comprises a respective detent lug 78 at each axial end on the outer circumference. The detent lug 78 is designed as an element protruding from an outer circumference of the sliding bearing bushing 71 and brings about a stronger form fit with the first wall 31 (also compare FIG. 3 in this regard). As can be seen in FIG. 5, one of the two illustrated detent lugs 78 is respectively directly adjacent to the longitudinal slot 77, wherein the two detent lugs 78 are arranged on opposite sides of the longitudinal slot 77 with respect to the circumferential direction. Each of the two detent lugs 78 extends only over a portion of the circumference of the sliding bearing bushing 71. Preferably, still further detent lugs 78 (not shown) may be provided distributed around the circumference of the sliding bearing bushing 71.

In addition, at each axial end, the sliding bearing bushing 71 of FIG. 5 comprises a plurality of recesses 79 distributed around the circumference, which recesses are substantially U-shaped and fully penetrate through the sliding bearing bushing 71 in the radial direction. By means of the recesses 79, more material of the damping element 72 that connects the layer of the damping element 72 that is located at the outer circumference of the sliding bearing bushing 71 to the radially inner layer can be available. As a result, an optimal interconnection of the sliding bearing bushing 71 and the damping element 72 can be produced.

The interconnection of the sliding bearing bushing 71 and the damping element 72 is further optimized by shoulders 71*b* at the inner circumference of sliding bearing bushing 71. The shoulders 71*b* are provided as enlargements of the inner diameter of the sliding bearing bushing 71 starting from the sliding surface 71*a*. That is to say, the radially inner region of the damping element 72 may be arranged in the shoulders 71*b*, of which one is respectively located at an axial end of the sliding bearing bushing 71.

Figure 6:
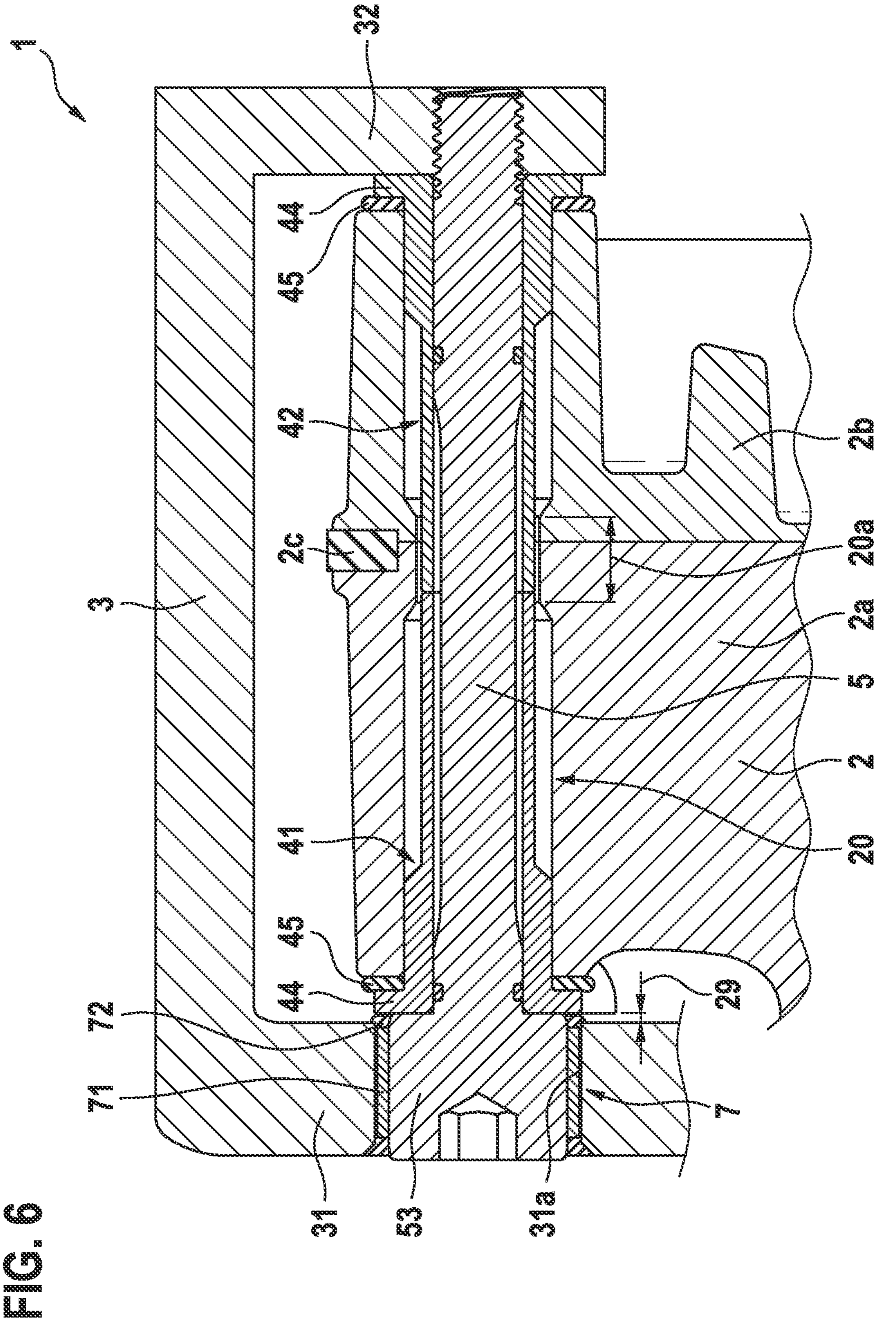
FIG. 6 shows a sectional view of a drive assembly according to a third exemplary embodiment of the present invention.

FIG. 6 shows a sectional view of a drive assembly 1 according to a third exemplary embodiment of the present invention. The third exemplary embodiment substantially corresponds to the first exemplary embodiment of FIGS. 1 to 4, with the difference that the damping element 45 is arranged only on the flange 44 of the respective sleeve 41, 42. That is to say, the damping element 45 is respectively disk-shaped and arranged exclusively between the side of the flange 44 that faces the drive unit 2 and of the drive unit 2.

Figure 7:
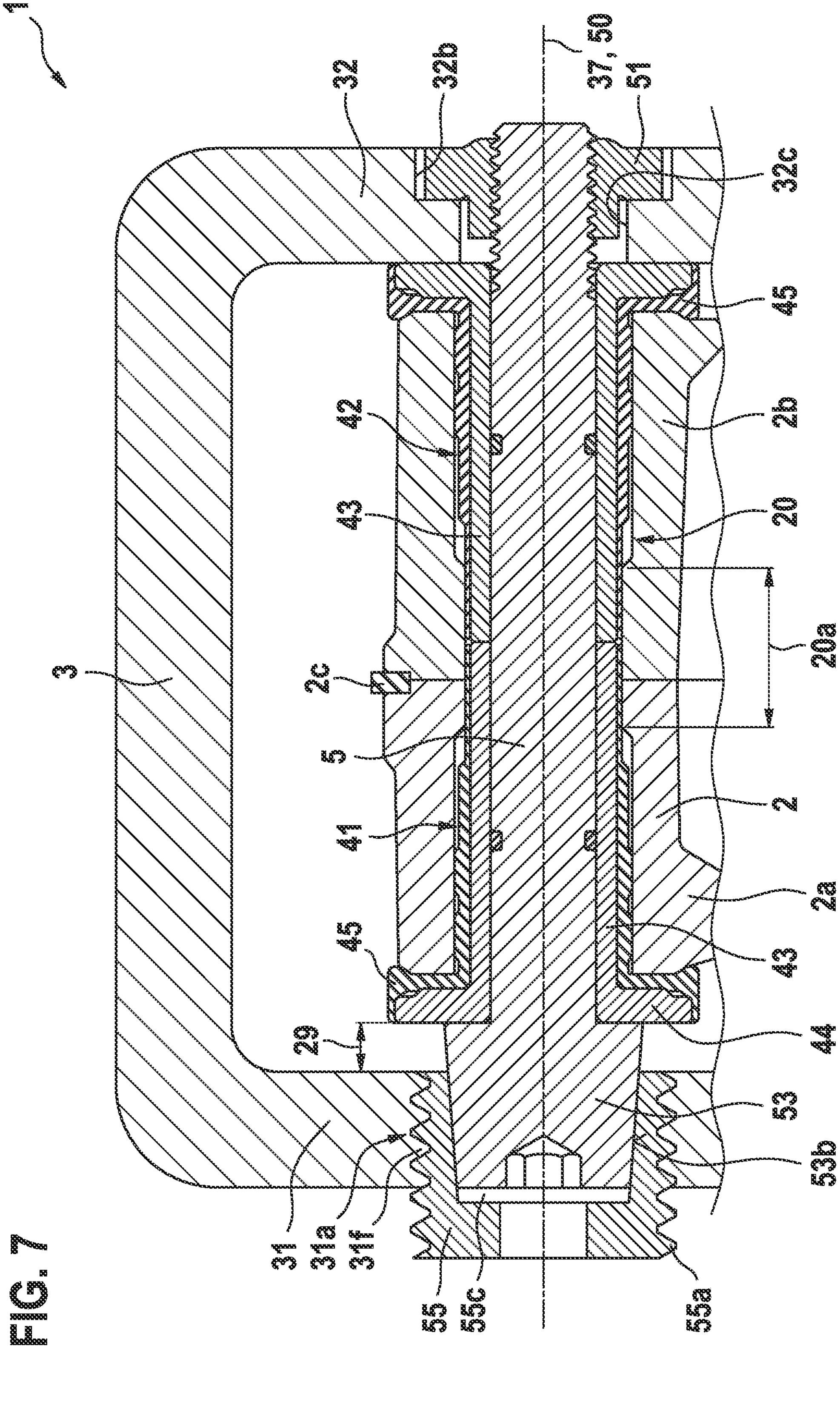
FIG. 7 shows a sectional view of a drive assembly according to a fourth exemplary embodiment of the present invention.

FIG. 7 shows a sectional view of a drive assembly 1 according to a fourth exemplary embodiment of the present invention. The fourth exemplary embodiment substantially corresponds to the first exemplary embodiment of FIGS. 1 to 4, with the difference that instead of a tolerance compensation element, a retaining element 55 is provided on the first wall 31. In contrast to the tolerance compensation element of FIGS. 1 to 4, the retaining element 55 brings about an axially immovable mounting of the bolt head 53. Moreover, the retaining element 55 brings about a fixation of the bolt head 53 on the first wall 31 in the radial direction completely without play.

The retaining element 55 is designed as a nut that can be screwed into an internal thread 31*f* of the wall opening 31*a* of the first wall 31. The retaining element 55 comprises a retaining opening 55*c* in which the bolt head 53 of the through-bolt 5 is held. The retaining opening 55*c* is designed to widen conically toward the second wall 32.

Additionally, the bolt head 53 comprises a conical lateral surface 53*b* corresponding to the conical geometry of the retaining opening 55*c*. That is to say, the bolt head 53, specifically its lateral surface 53*b*, is designed to taper toward the first wall 31. The corresponding cone angles of the retaining opening 55*c* and of the lateral surface 53*b* are identical.

During the assembly of the drive assembly 1 of FIG. 7, analogously to the drive assembly 1 of FIGS. 1 to 4, the clamping to the second wall 32, i.e., the screw connection of the drive unit 2 to the second wall 32 by means of the through-bolt 5, is produced first. Subsequently, the retaining element 55 can then be screwed until additional clamping of the bolt head 53 in the direction of the second wall 32 takes place. As a result of the conical surfaces of the retaining opening 55*c* and the lateral surface 53*b*, the bolt head 53 is centered in the radial direction in the wall opening 31*a* so that radial clearance is reduced to zero. In particular, a bolt axis 50 is thus exactly oriented coaxially with an opening axis 37 on which the two wall openings 31*a*, 32*c* are located.

The fastening by means of the retaining element 55 offers the additional advantage that high tolerances on the first wall 31 can also be easily and effectively compensated.

Figure 8:
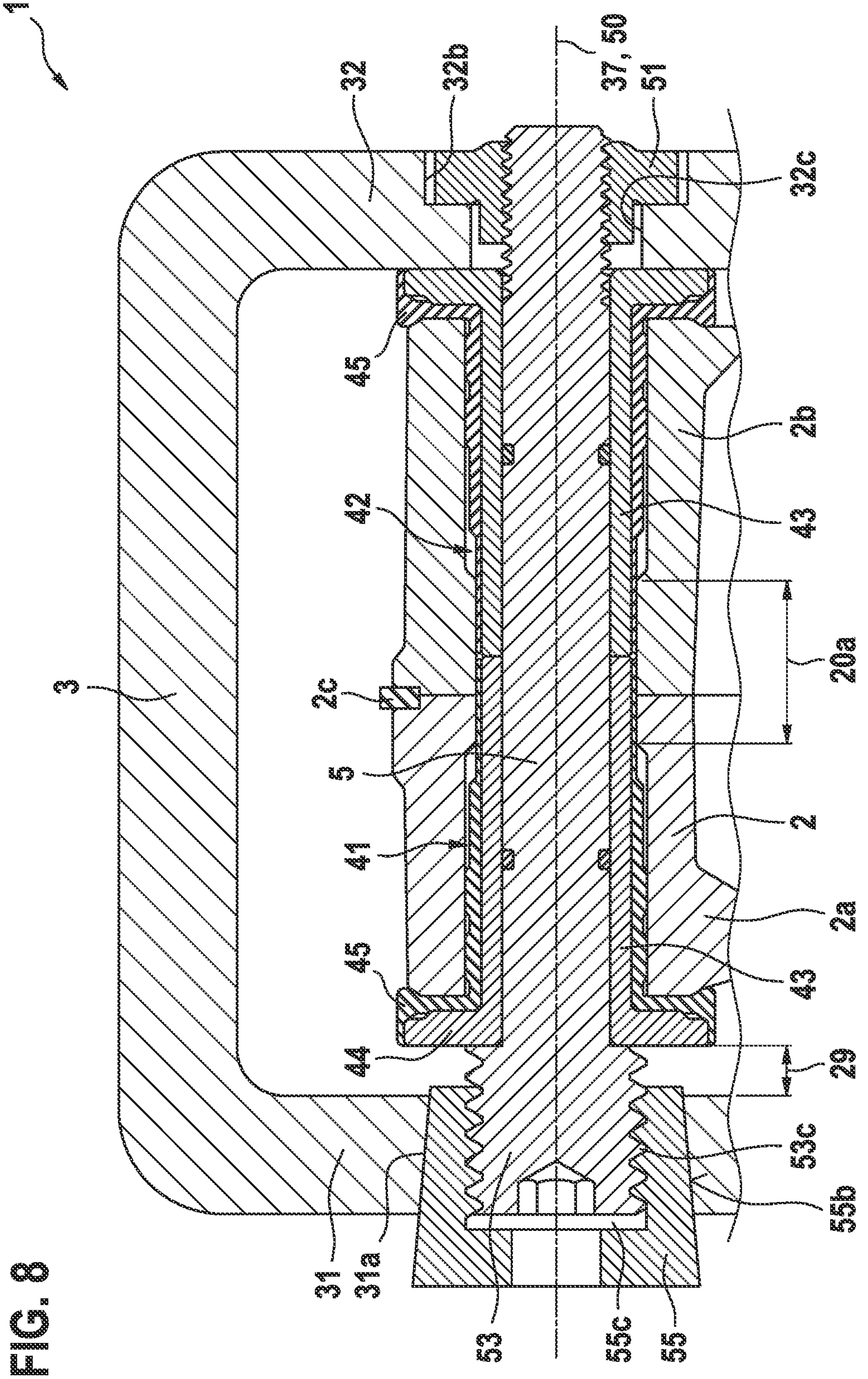
FIG. 8 shows a sectional view of a drive assembly according to a fifth exemplary embodiment of the present invention.

FIG. 8 shows a sectional view of a drive assembly 1 according to a fifth exemplary embodiment of the present invention. The fifth exemplary embodiment substantially corresponds to the fourth exemplary embodiment of FIG. 7, with the difference of an alternative design of the retaining element 55 and of the bolt head 53. In the fifth exemplary embodiment of FIG. 8, the screw connection is provided by means of internal thread and external thread 53*c* between the bolt head 53 and the retaining element 55. Specifically, the retaining element 55 is screwed onto an external thread 53*c* of the bolt head 53.

Furthermore, in the fifth exemplary embodiment of FIG. 8, an outer lateral surface 55*b* of the retaining element 55 is conically tapered toward the second wall 32. Moreover, an inner lateral surface of the wall opening 31*a* is conically tapered toward the second wall 32. The cone angles of the two lateral surfaces are identical. This results in substantially the same effect of the radial centering of the bolt head 53 to the wall opening 31*a* as in the fourth exemplary embodiment of FIG. 7, with the difference that the retaining element 55 screwed to the bolt head 53 is additionally likewise centered. In contrast to the fourth exemplary embodiment of FIG. 7, in the fifth exemplary embodiment, opposing force initiation on the through-bolt 5 takes place through the centering by means of the retaining element 5.

Figure 9:
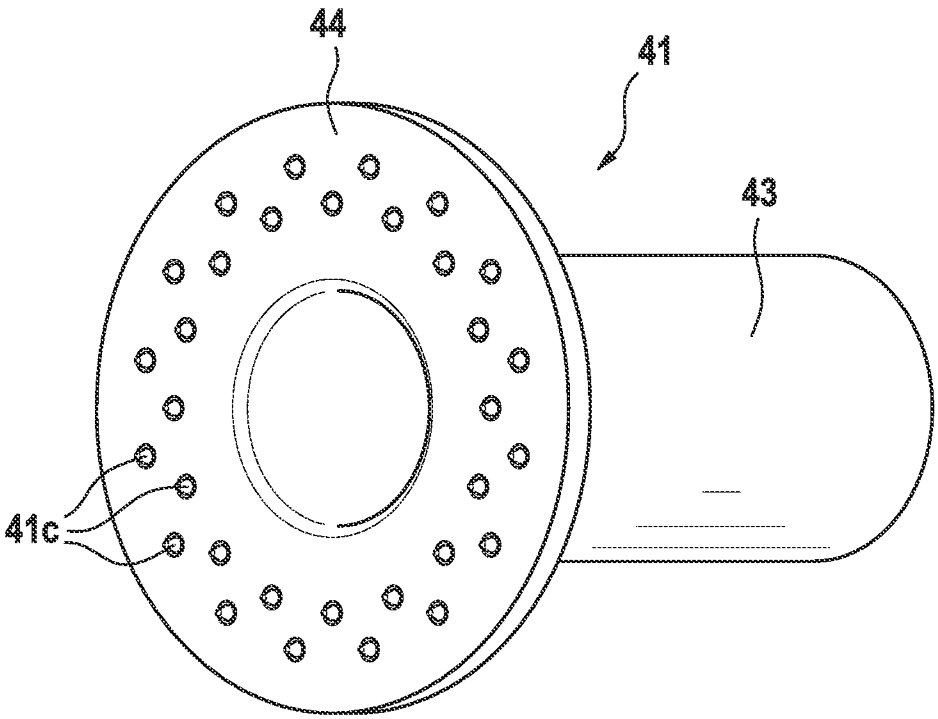
FIG. 9 shows a detail of a drive assembly according to a sixth exemplary embodiment of the present invention.

FIG. 9 shows a detail of a drive assembly 1 according to a sixth exemplary embodiment of the present invention. The sixth exemplary embodiment substantially corresponds to the first exemplary embodiment of FIGS. 1 to 4, with the difference of an alternative sleeve 41, 42.

Only one of the two sleeves 41, 42 is shown in FIG. 9, wherein the two sleeves 41, 42 are preferably designed identically. The sleeve 41 is shown in a perspective view in FIG. 10.

The sleeve 41 comprises a shank 43 and a flange 44. The shank 43 is inserted into the through-hole 20 of the drive unit 2. The flange 44 is provided for abutment against an inner side of the second wall 32 of the frame interface 3 (cf., e.g., FIG. 2A). The flange 44 of the sleeve 41 comprises a plurality of protruding form fit elements 41*c* on the side assigned to the wall 32. Preferably, the form fit elements 41*c* are arranged in one or more circles that are concentric with the through-opening of the sleeve 41, preferably in two circles as shown in FIG. 9.

Figure 10:
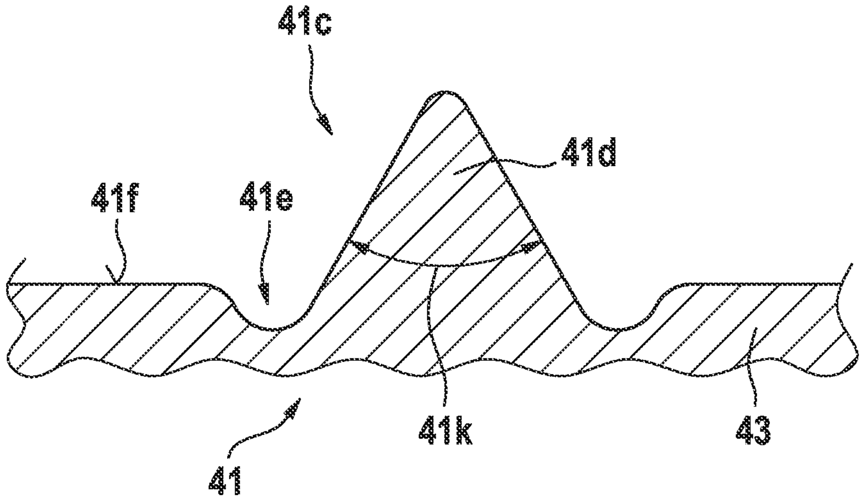
FIG. 10 shows a detailed sectional view of FIG. 9.

A single form fit element 41*c* of the sleeve 41 of FIG. 9 is shown in a detailed sectional view in FIG. 10. Each form fit element 41*c* comprises a pyramid 41*d* protruding from a surface 41*f* of the flange 44. Alternatively, each form fit element 41*c* may also preferably comprise a protruding cone. The pyramid 41*d* is formed as a straight pyramid and has an opening angle 41*k* of preferably less than 60°. In this case, the pyramids 41*d* have the effect that they are pressed into the surface of the wall 32, i.e., plastically deform the wall, as the sleeve 41 is screwed to the wall 32. This produces a micro form fit between the sleeve 41 and the wall 32 in a plane perpendicular to the screw axis, which can enable a particularly firm connection of the drive unit 2 and the frame interface 3 to one another. Slippage of the drive unit 2 relative to the frame interface 3 can thus be reliably prevented.

In addition to the pyramid 41*d*, each form fit element 41*c* comprises a respective depression 41*e*, which is formed on an outer circumference of the pyramid 41*d* and in the surface 41*f* of the flange 44. The depression 41*e* can, for example, receive material of the wall 32 that is displaced by the penetration of the pyramid 41*d* into the wall 32, so that the wall 32 and the flange 44 can reliably rest precisely planarly on one another. For example, a respective separate depression 51*e* partially or completely surrounding the pyramid 41*d* may be provided per pyramid 41*d*. Alternatively, a single depression 41*e* can preferably be formed in the surface 41*f* of the flange 44, the pyramids 41*d* being arranged on the radial inner side and/or outer side of said depression.

Figure 11:
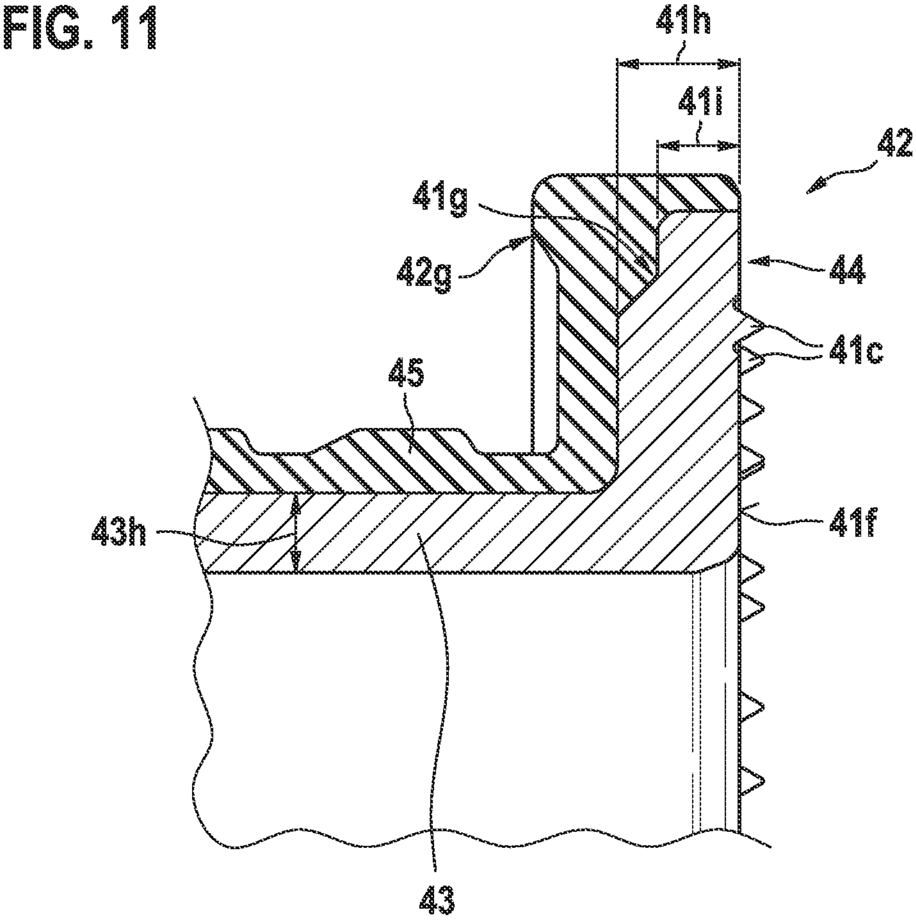
FIG. 11 shows a detailed sectional view of a drive assembly according to a seventh exemplary embodiment of the present invention.

FIG. 11 shows a detailed sectional view of a drive assembly 1 according to a seventh exemplary embodiment of the present invention. In FIG. 11, only one of the sleeves 41, 42 is shown, namely the sleeve 42 on the side of the second wall 32. Preferably, the first sleeve 41 on the first wall 31 is designed identically. The seventh exemplary embodiment substantially corresponds to the first exemplary embodiment of FIGS. 1 to 4, with the difference of an alternative design of the sleeve 42 in the region of the flange 44. At a radially outer end of the flange 44, the sleeve 42 comprises a taper 41*g* on the side of the flange 44 that faces the shank 43. The taper 41*g* is designed in such a way that a difference between the maximum thickness 41*h* and a minimum thickness 41*i* of the flange 44 corresponds to at least 50%, preferably at most 150%, of a wall thickness 43*h* of the shank 43 of the sleeve 42. In this respect, the thicknesses along a direction parallel to a longitudinal axis of the sleeve 42 are considered.

The damping element 45 is designed to compensate for the taper 41*g* of the flange 44. Additionally, at a radially outermost end, the damping element 45 comprises a thickening 42*g*. As a result, a particularly thick damping element 42 is present at the radially outer end of the flange 44. This has an advantageous effect on an optimal seal between the sleeve 42 and the drive unit 2.

Figure 12:
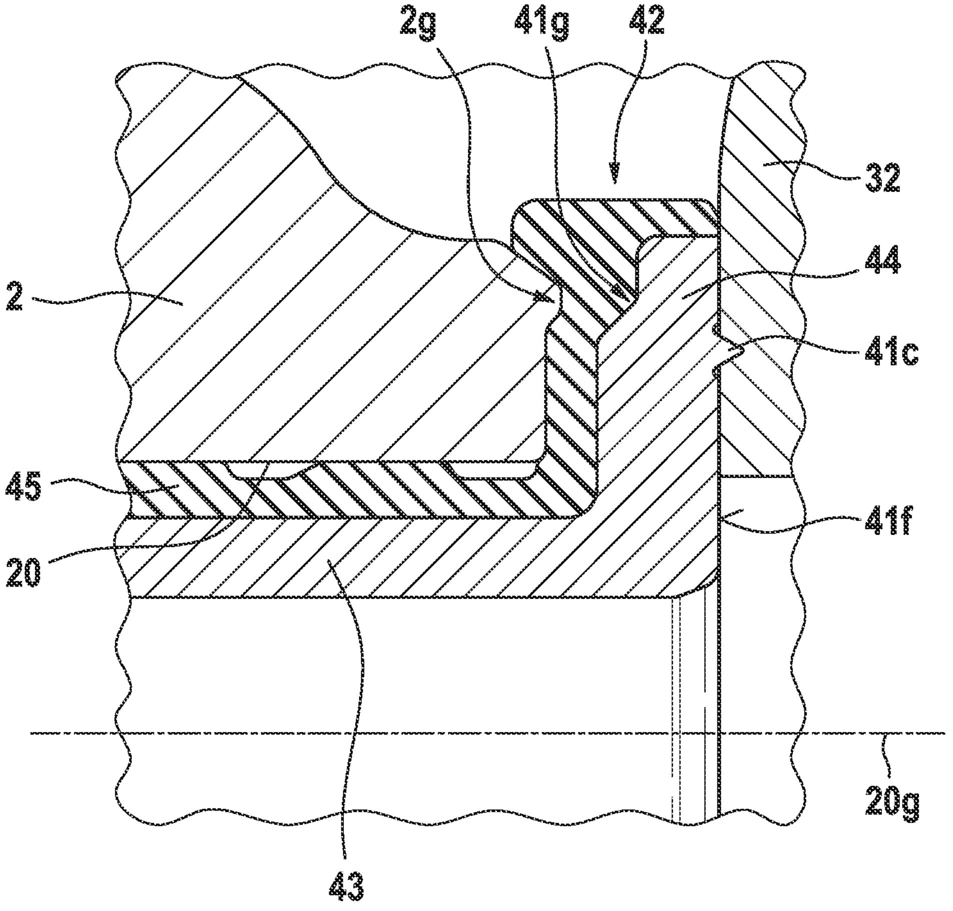
FIG. 12 shows a further detailed sectional view of the drive assembly of FIG. 11.

This seal is furthermore supported by a protruding annular rib 2*g* of the drive unit 2, which is provided in the seventh exemplary embodiment as shown in FIG. 12. The protruding annular rib 2*g* has a trapezoidal cross-section and is arranged concentrically with the through-hole 20 of the drive unit 2. In the pressed-in state of the sleeve 42 into the through-hole 20, the protruding annular rib 2*g* and the taper 41*g* of the sleeve 42 are located on the same radius with respect to the drilling axis 20*g* of the through-hole 20. As a result, the protruding annular rib 2*g* dips into the soft zone of the damping element 45 in the region of the taper 41*g* when the sleeve 42 and the drive unit 2 are pressed against one another in the fully screwed state. As a result of the elasticity of the damping element 45, an optimal seal can thus be provided at the drive unit 2.

Figure 13:
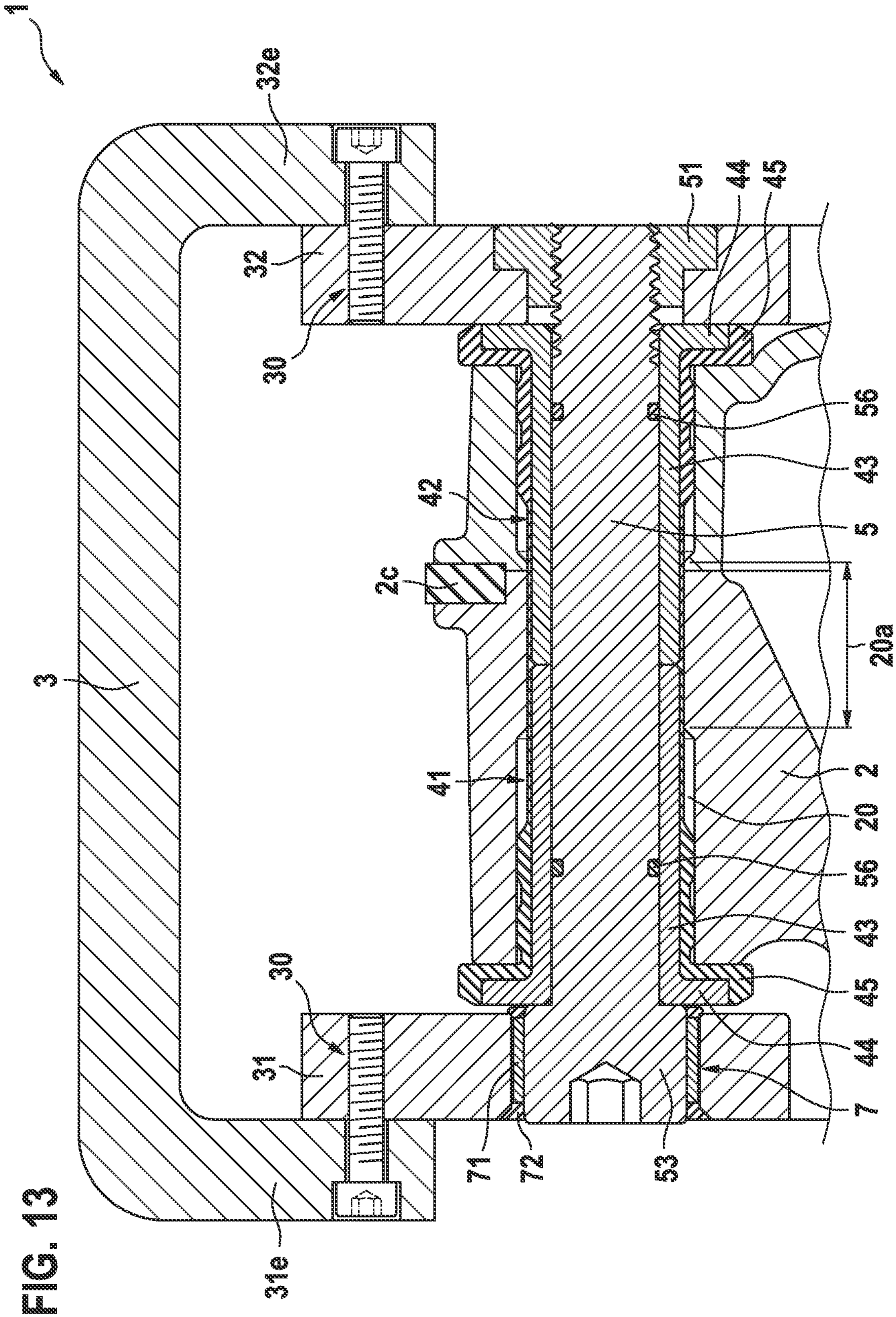
FIG. 13 shows a sectional view of a drive assembly according to an eighth exemplary embodiment of the present invention.

FIG. 13 shows a sectional view of a drive assembly 1 according to an eighth exemplary embodiment of the present invention. The eighth exemplary embodiment substantially corresponds to the first exemplary embodiment of FIGS. 1 to 4, with the difference that the drive unit 2 is indirectly screwed to the frame interface 3. Specifically, the two walls 31, 32 to which the drive unit 2 is screwed are designed as separate components from the frame interface 3. The walls 31, 32 may be designed as retaining plates, for example. In this case, the walls 31, 32 can be connected to frame walls 31*e*, 32*e* of the frame interface 3 by means of additional screw connections 30 and/or weld connections (not shown). As a result, a particularly high flexibility of the drive assembly 1 can be provided.

Figure 14:
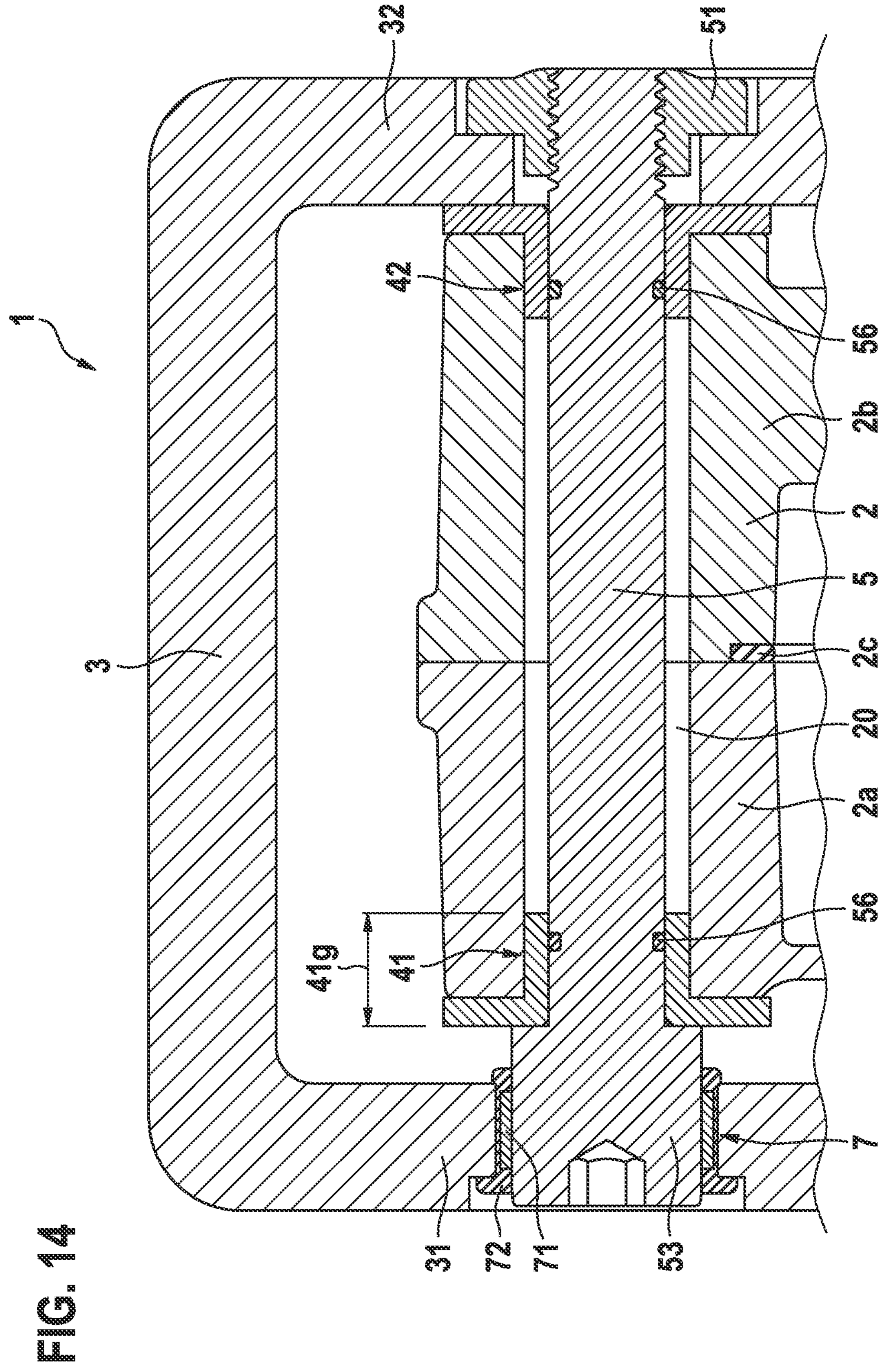
FIG. 14 shows a sectional view of a drive assembly according to a ninth exemplary embodiment of the present invention.

FIG. 14 shows a sectional view of a drive assembly 1 according to a ninth exemplary embodiment of the present invention. The ninth exemplary embodiment substantially corresponds to the first exemplary embodiment of FIGS. 1 to 4, with the difference of an alternative design of the sleeves 41, 42. In the ninth exemplary embodiment of FIG. 14, the two sleeves 41, 42 are designed as shortened metal sleeves that particularly simple and cost-effective to produce. The sleeves 41, 42 are designed in such a way that they do not contact one another within the through-hole 20.

Moreover, the two sleeves 41, 42 have a short axial length 41*g*, which is, for example, smaller than an inner diameter of the through-hole 20. As a result, material can be saved and simple pressing of the sleeves 41, 42 into the through-hole 20 is also enabled since there is only a small press length. The drive assembly 1 of the ninth exemplary embodiment thus enables a particularly simple and cost-effective construction.

Figure 15:
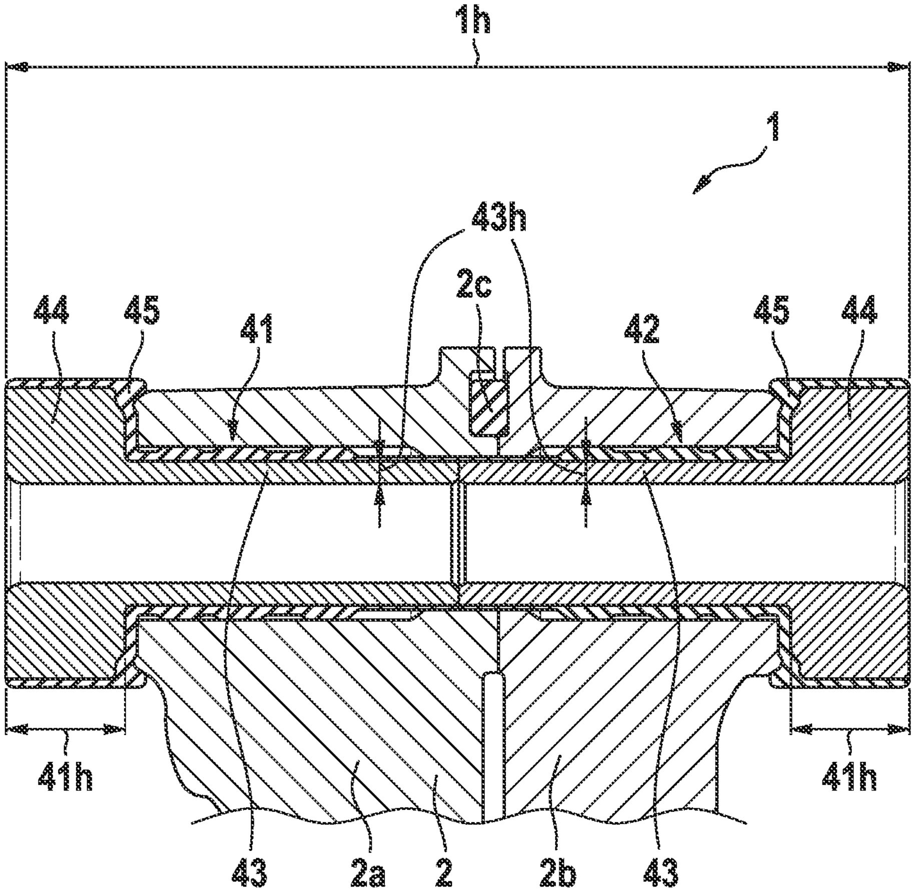
FIG. 15 shows a sectional view of a drive assembly according to a tenth exemplary embodiment of the present invention.
Figure 16:
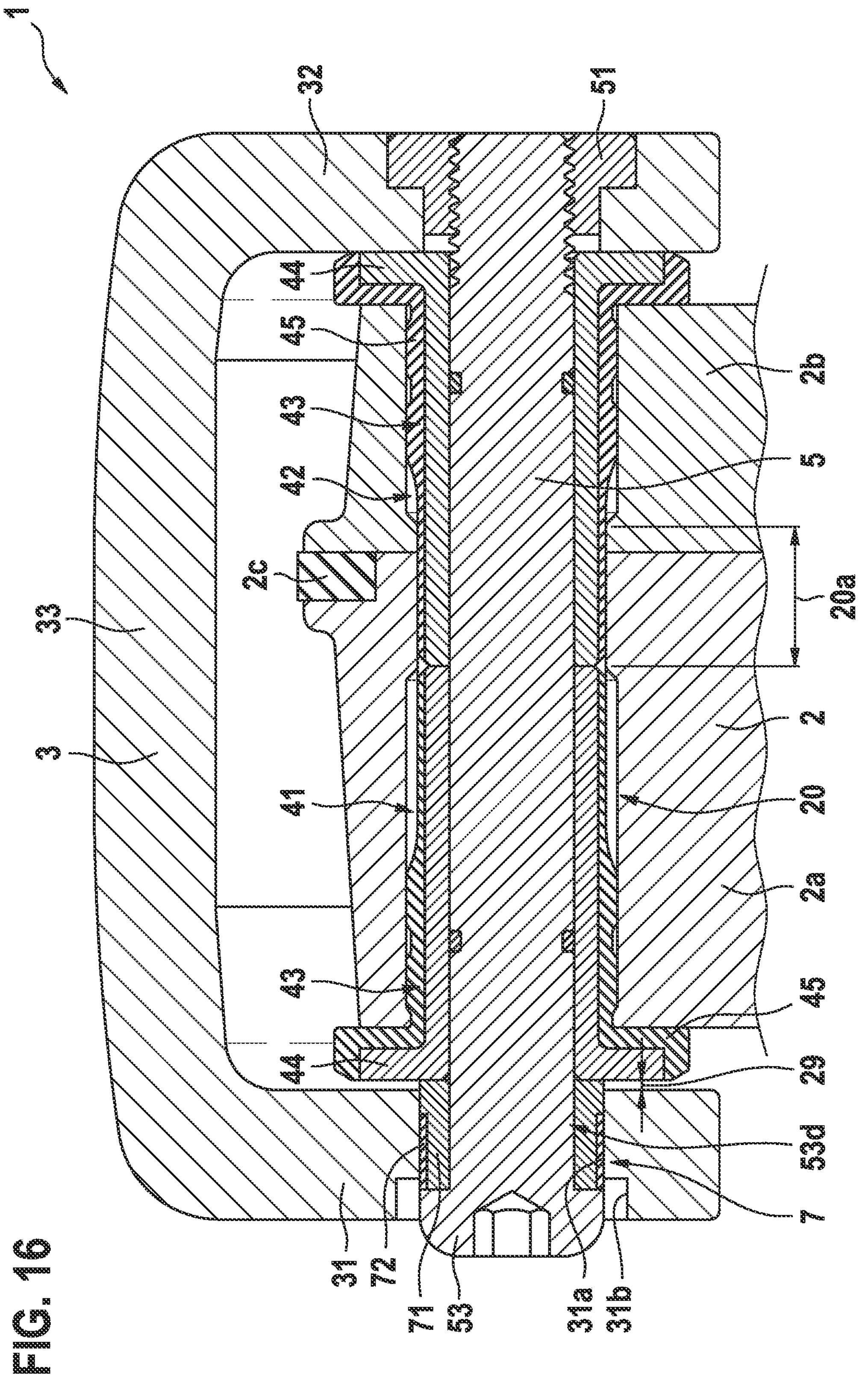
FIG. 16 shows a sectional view of a drive assembly according to an eleventh exemplary embodiment of the present invention.

FIG. 15 shows a sectional view of a drive assembly 1 according to a tenth exemplary embodiment of the present invention. The tenth exemplary embodiment substantially corresponds to the seventh exemplary embodiment of FIGS. 11 and 12, with the difference that alternative sleeves 41, 42 are used. Specifically, the flanges 44 of the sleeves 41, 42 are thicker in the tenth exemplary embodiment of FIG. 15 than in the seventh exemplary embodiment. Specifically, the thickness 41*h* of the flanges 44 in the tenth exemplary embodiment is a multiple of, preferably at least three times, a wall thickness 43*h* of the corresponding shank 43 of the respective sleeve 41, 42. As a result, an overall width 1*h* of the drive assembly 1 can be larger compared to the seventh exemplary embodiment, in which the thickness 41*h* of the flange 44 is approximately equal to the wall thickness 43*h* of the shank 43, for example. The tenth exemplary embodiment of FIG. 15 thus illustrates that through changes in the sleeves 41, 42, it is possible to adapt the drive assembly 1 to various vehicles 100 in a particularly simple and cost-effective manner. FIG. 16 shows a sectional view of a drive assembly 1 according to an eleventh exemplary embodiment of the present invention. The eleventh exemplary embodiment substantially corresponds to the first exemplary embodiment of FIGS. 1 to 4, with the difference of an alternative design of the floating bearing on the first wall 31. In the eleventh exemplary embodiment of FIG. 16, the through-bolt 5 and the tolerance compensation element 7 are mounted together axially movably relative to the first wall 31. In this case, in contrast to the first exemplary embodiment, not the bolt head 53 but rather a bolt shank 53*d* of the through-bolt 5 is arranged within the tolerance compensation element 7. In the eleventh exemplary embodiment, the through-bolt 5 additionally clamps the tolerance compensation element 7 against the first sleeve 41. The through-bolt 5 and the tolerance compensation element 7 can thus slide together in the wall opening 31*a* of the first wall 31. The wall opening 31*a* also has an enlarged diameter 31*b* on the outside so that the bolt head 53 can be arranged partially within the wall opening 31*a*. Alternatively, the bolt head 53 can also be arranged entirely outside the wall opening 31*a*.

Figure 17:
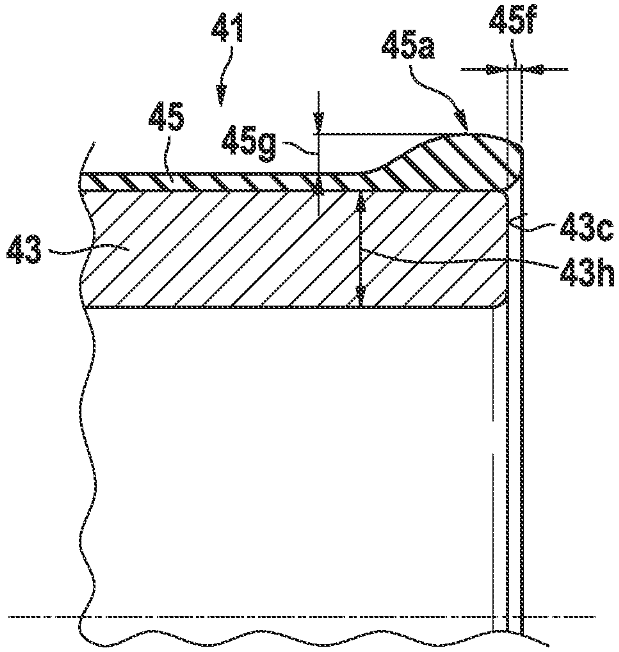
FIG. 17 shows a detailed sectional view of a drive assembly according to a twelfth exemplary embodiment of the present invention.

FIG. 17 shows a detailed sectional view of a drive assembly 1 according to a twelfth exemplary embodiment of the present invention. The twelfth exemplary embodiment substantially corresponds to the seventh exemplary embodiment of FIGS. 11 and 12, with the difference of an alternative design of the damping element 45. In the twelfth exemplary embodiment of FIG. 17, the damping element 45 comprises a sealing bead 45*a* at an axial end of the sleeve 41 that is opposite the flange 44. The sealing bead 45*a* protrudes in the axial direction from an end face 43*c* of the shank 43 of the sleeve 41. Moreover, the sealing bead 45*a* protrudes radially outward from the damping element 45.

The axial protrusion 45*f* of the sealing bead 45*a* is preferably at least 20% of the wall thickness 43*h* of the shank 43. Moreover, the radial protrusion 45*g* is preferably at least 30% of the wall thickness 43*h* of the shank 43.

Figure 18:
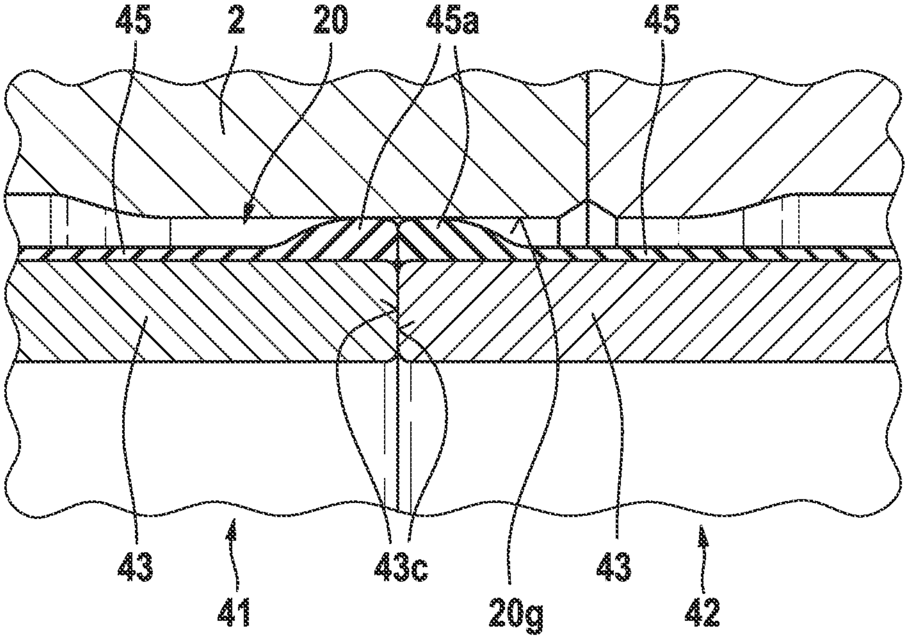
FIG. 18 shows a further detailed sectional view of a drive assembly according to the twelfth exemplary embodiment of the present invention.

The sealing bead 45*a* on the damping elements 45 of the sleeves 41, 42 brings about a particularly reliable seal against ingress of fluid. This is achieved by pressing each seal bead 45*a* both axially and radially, as shown in FIG. 18. By clamping the sleeves 41, 42 in the axial direction against one another, the two sealing beads 45*a* are axially pressed against one another. For example, by a radial interference of the sealing bead 45*a* with respect to an inner circumference 20*g* of the through-hole 20, each sealing bead 45*a* can additionally be pressed against the inner circumference 20*g* of the through-hole 20 in the radial direction. A reliable seal by means of the sealing bead 45*a* thus results radially outside the shanks 43 of the sleeves 41, 42 in the plane of the contacting end faces 43*c* of the sleeves 41, 42.

Figure 19:
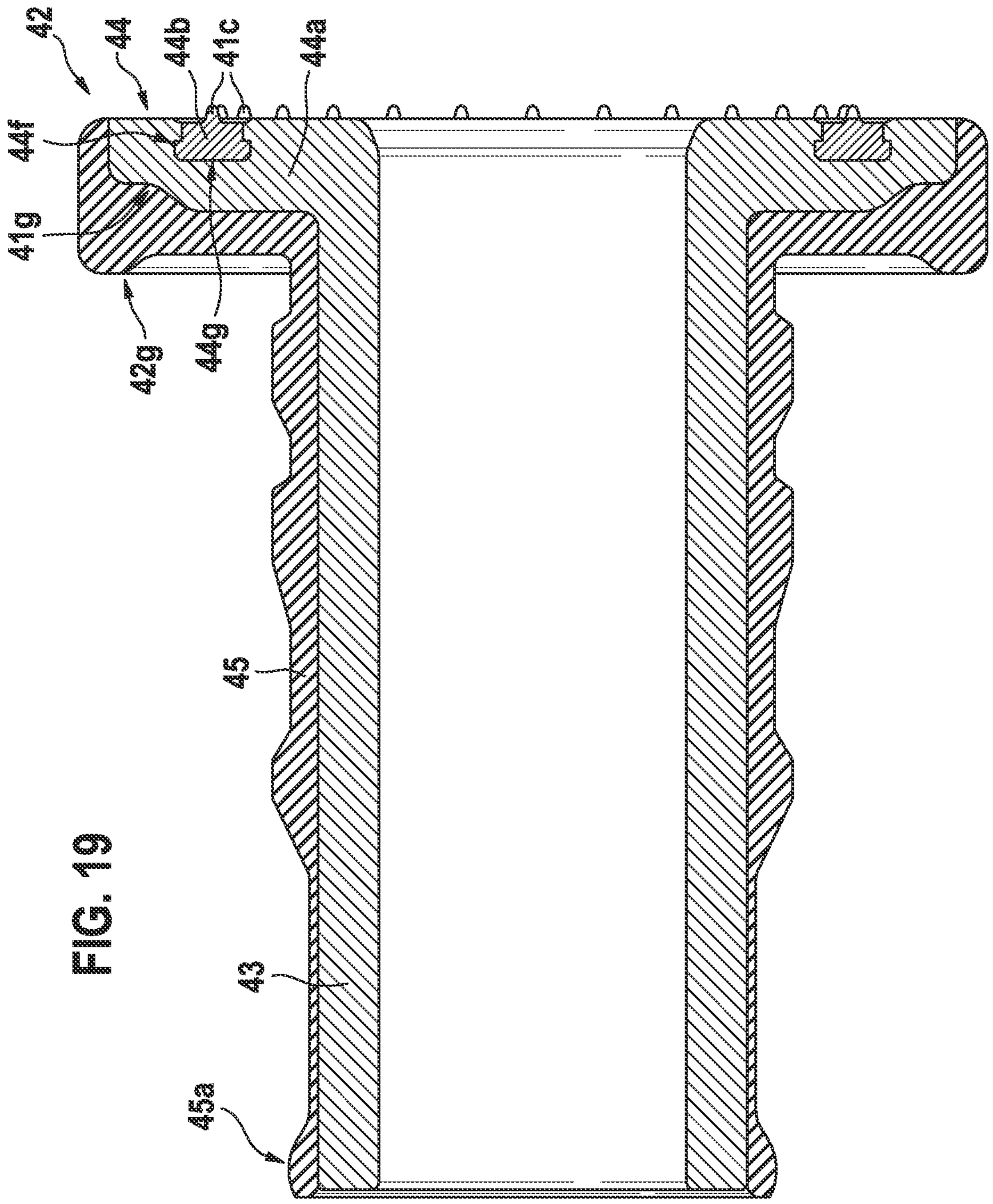
FIG. 19 shows a detailed sectional view of a drive assembly according to a thirteenth exemplary embodiment of the present invention.

FIG. 19 shows a detailed sectional view of a drive assembly 1 according to a thirteenth exemplary embodiment of the present invention. The thirteenth exemplary embodiment substantially corresponds to the twelfth exemplary embodiment of FIGS. 17 and 18, with the difference of an alternative design of the flange 44 of the sleeves 41, 42. In the thirteenth exemplary embodiment of FIG. 19, the flange 44 of the sleeve 42 is formed in two parts and comprises a flange base body 44*a* and an insert ring 44*b*. The flange base body 44*a* is formed together with the shank 43 of the sleeve 42 as a one-piece component. The insert ring 44*a* is formed concentrically with the sleeve opening of the sleeve 42 and is arranged in a groove 44*g* of the flange base body 44*a*. The insert ring 44*b* is in this case held in the groove 44*g* by means of an axial form fit 44*f*. The axial form fit 44*f* can, for example, be produced by peening, i.e., forming, sub-regions of the flange base body 44*a*. In the thirteenth exemplary embodiment, the form fit elements 41*c* are arranged exclusively on the insert ring 44*a* and are formed as a part thereof.

The insert ring 44*b* is formed from a hardened steel that has a significantly higher hardness than the material of the flange base body 44*a* and the shank 43. This ensures a particularly high degree of robustness and thus permanently reliable function of the form fit elements 41*c*. Moreover, the two-part design of the flange 44 enables the flange base body 44*a* and the shank 43 to be formed from a steel that is well-suited for cold forming. As a result, the sleeves 41, 42 can be produced in a particularly simple and cost-effective manner.

What is claimed is:

1. A drive assembly of a vehicle operable with muscular power and/or motor power, the drive assembly comprising:
- a drive unit;
- a frame interface, the drive unit being arranged at least partially between a first wall and a second wall of the frame interface, and the drive unit includes a through-hole, enabling mounting of the drive unit within a housing of the drive unit;
- two sleeves inserted on both sides into the through-hole of the drive unit; and
- a through-bolt inserted through the through-hole and the two sleeves and holding the drive unit to each of the first and second walls.

2. The drive assembly according to claim 1, wherein each of the two sleeve includes a shank and a flange, wherein the shank is arranged at least partially within the through-hole, and the flange is arranged outside the through-hole.

3. The drive assembly according to claim 2, wherein:
- the flange of at least one of the sleeves includes a taper at a radially outer end and on a side facing the shank, and
- the taper is compensated by a damping element.

4. The drive assembly according to claim 3, wherein the drive unit includes at least one protruding annular rib arranged concentrically with one of the openings, wherein the protruding annular rib and the taper of the flange of the sleeve are arranged on a same radius with respect to a drilling axis of the through-hole.

5. The drive assembly according to claim 2, wherein:

the flange of at least one of the sleeves has a thickness substantially corresponding to a wall thickness of the shank of the sleeve, or the flange of at least one of the sleeves has a thickness corresponding to at least 1.5 times a wall thickness of the shank of the sleeve.

6. The drive assembly according to claim 1, wherein the two sleeves are configured such that in a state fully inserted into the through-hole and in an unclamped state, there is a predefined axial distance between the two sleeves within the through-hole.

7. The drive assembly according to claim 6, wherein the predefined axial distance is such that in the clamped state, the axial distance is compensated by clamping of the two sleeves using the through-bolt and by elastic deformation of a damping element.

8. The drive assembly according to claim 1, wherein the through-bolt is fastened to the second wall, and the through-bolt is axially movably held on the first wall.

9. The drive assembly according to claim 8, further comprising:

a tolerance compensation element, wherein the first wall includes a first wall opening, wherein the tolerance compensation element is formed in a shape of a sleeve and is arranged within the first wall opening, and a bolt head or a bolt shank of the through-bolt is arranged within the tolerance compensation element.

10. The drive assembly according to claim 9, wherein the tolerance compensation element includes a sliding bearing bushing and a damping shell surrounding the sliding bearing bushing.

11. The drive assembly according to claim 10, wherein the sliding bearing bushing and the bolt head are configured such that the bolt head widens the sliding bearing bushing in a radial direction when the bolt head is arranged within the tolerance compensation element.

12. The drive assembly according to claim 11, wherein the sliding bearing bushing is slotted.

13. The drive assembly according to claim 12, wherein a slot of the sliding bearing bushing is formed obliquely with respect to an axial direction of the sliding bearing bushing.

14. The drive assembly according to claim 10, wherein:

the damping shell includes at least one sealing lip on a radially outer side, and the at least one sealing lip is configured such that there is an axial form fit between the damping shell and the first wall when the tolerance compensation element is arranged in the first wall opening.

15. The drive assembly according to claim 14, wherein the damping shell is configured such that the at least one sealing lip is pushed radially outward when the bolt head of the through-bolt is arranged within the tolerance compensation element.

16. The drive assembly according to claim 10, wherein the sliding bearing bushing at at least one axial end includes a radially outward protruding detent lug.

17. The drive assembly according to claim 1, wherein:

the through-bolt is fastened to the second wall, the through-bolt clamps the two sleeves and the second wall against one another, the through-bolt is held on the first wall using a retaining element, and the retaining element fixes the through-bolt to the first wall in the radial direction.

18. The drive assembly according to claim 17, wherein:

the retaining element is screwed into an internal thread of the wall opening of the first wall using an external thread, and/or the retaining element includes a retaining opening in which a bolt head of the through-bolt is held, and/or the retaining opening widens toward the second wall, and/or the bolt head of the through-bolt is configured to taper toward the first wall.

19. The drive assembly according to claim 17, wherein:

the retaining element is arranged in the wall opening of the first wall, and/or the bolt head of the through-bolt includes an external thread, and/or the retaining element is screwed onto the external thread of the bolt head, and/or the retaining element includes a lateral surface tapering toward the second wall, and/or the wall opening of the first wall is configured to taper toward the second wall.

20. The drive assembly according to claim 1, wherein:

each of the sleeves includes a press region, and a press fit is formed between the press region and the through-hole.

21. The drive assembly according to claim 1, wherein the through-hole centrally includes a centering region, which has a smaller inner diameter than the rest of the through-hole, for centering the two sleeves.

22. The drive assembly according to claim 1, wherein the through-bolt is a screw, and the through-bolt is screwed into an internal thread of the second wall.

23. The drive assembly according to claim 1, wherein:

the through-bolt is a screw, and the through-bolt is screwed into a nut arranged on the second wall.

24. The drive assembly according to claim 23, wherein the nut is arranged in a torsion-proof manner in a recess of the second wall.

25. A drive assembly of a vehicle operable with muscular power and/or motor power, the drive assembly comprising:

a drive unit;

a frame interface, the drive unit being arranged at least partially between a first wall and a second wall of the frame interface, and the drive unit includes a through-hole, enabling mounting of the drive unit within a housing of the drive unit;

two sleeves inserted on both sides into the through-hole of the drive unit; and a through-bolt inserted through the through-hole and the two sleeves and holding the drive unit to each of the first and second walls, wherein the two sleeves contact one another within the through-hole, and the through-bolt clamps the two sleeves against one another, so that axial forces generated by tightening the through-bolt to fasten the drive unit to the frame interface are absorbed by the two sleeves.

26. A drive assembly of a vehicle operable with muscular power and/or motor power, the drive assembly comprising:

a drive unit;

a frame interface, the drive unit being arranged at least partially between a first wall and a second wall of the frame interface, and the drive unit includes a through-hole;

two sleeves inserted on both sides into the through-hole of the drive unit; and a through-bolt inserted through the through-hole and the two sleeves and holding the drive unit to each of the first and second walls, wherein each of the two sleeve includes a shank and a flange, wherein the shank is arranged at least partially within the through-hole, and the flange is arranged outside the through-hole, wherein each of the sleeves includes a damping element arranged on a side of the flange that faces the drive unit, and wherein the damping element is formed from a vibration-damping material.

27. The drive assembly according to claim 26, wherein the damping element at least partially surrounds the shank.

28. The drive assembly according to claim 27, wherein at an axial end opposite the flange, the damping element includes a sealing bead axially and radially protruding from the shank.

29. The drive assembly according to claim 28, wherein the sealing bead protrudes in an axial direction from an end face of the shank of the sleeve.

30. A drive assembly of a vehicle operable with muscular power and/or motor power, the drive assembly comprising:

a drive unit;

a frame interface, the drive unit being arranged at least partially between a first wall and a second wall of the frame interface, and the drive unit includes a through-hole;

two sleeves inserted on both sides into the through-hole of the drive unit; and a through-bolt inserted through the through-hole and the two sleeves and holding the drive unit to each of the first and second walls, wherein each of the two sleeve includes a shank and a flange, wherein the shank is arranged at least partially within the through-hole, and the flange is arranged outside the through-hole, wherein:

on a side facing a corresponding wall of the frame interface, the flange of at least one of the sleeves includes a plurality of protruding form fit elements, and the form fit elements are configured to press into the corresponding wall as a result of the screw connection to the corresponding wall.

31. The drive assembly according to claim 30, wherein:

the flange is formed in two parts and includes a flange base body and an insert ring, the flange base body is formed together with the shank as a one-piece component, and the form fit elements are arranged on the insert ring.

32. The drive assembly according to claim 31, wherein the insert ring is arranged in a groove of the flange base body, and wherein the insert ring is held in the groove by an axial form fit.

33. The drive assembly according to claim 31, wherein the flange base body and the insert ring are formed from different materials, wherein the insert ring has a greater hardness than the flange base body.

34. The drive assembly according to claim 30, wherein each of the form fit elements includes a pyramid or a cone, the pyramid or cone protruding from a surface of the flange.

35. The drive assembly according to claim 34, wherein in the surface of the flange, each of the form fit elements includes a depression adjacent to the pyramid.

36. A vehicle operable with muscular power and/or motor power, comprising:

a drive assembly including:

a drive unit, a frame interface, the drive unit being arranged at least partially between a first wall and a second wall of the frame interface, and the drive unit includes a through-hole, enabling mounting of the drive unit within a housing of the drive unit, two sleeves inserted on both sides into the through-hole of the drive unit, and a through-bolt inserted through the through-hole and the two sleeves and holding the drive unit to each of the first and second walls.

37. The vehicle according to claim 36, further comprising a chainring connected to an output shaft of the drive unit, wherein the second wall of the drive assembly is arranged on a side of the chainring.

38. An insert sleeve for a drive assembly of a vehicle operable with muscular power and/or motor power, comprising:

a shank configured to be received in a wall opening of a component of the drive assembly; and a flange arranged at an axial end of the shank for abutment against a surface of the component, wherein the flange includes, on a side facing the component, a plurality of protruding form-fit elements, wherein the form-fit elements are configured such that, when the insert sleeve is fastened to the component by a screw connection, the form-fit elements press into the surface of the component and plastically deform the component to produce a form-fit in a plane perpendicular to an axis of the screw connection, thereby preventing relative rotation and/or slippage between the insert sleeve and the component.

* * * * *